(12) United States Patent
Garshelis et al.

(10) Patent No.: US 8,438,937 B2
(45) Date of Patent: *May 14, 2013

(54) DEVICES AND METHODS FOR DETECTING RATES OF CHANGE OF TORQUE

(76) Inventors: Ivan J. Garshelis, Dalton, MA (US);
Ryan J. Kari, San Diego, CA (US);
Stijn P. L. Tollens, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/946,887

(22) Filed: Nov. 16, 2010

(65) Prior Publication Data
US 2011/0181046 A1    Jul. 28, 2011

Related U.S. Application Data

(63) Continuation of application No. 11/969,897, filed on Jan. 5, 2008, now Pat. No. 7,832,289.

(60) Provisional application No. 60/883,780, filed on Jan. 6, 2007.

(51) Int. Cl.
*G01L 3/00* (2006.01)

(52) U.S. Cl.
USPC ............ 73/862.333; 73/862.335; 73/862.325; 702/43

(58) Field of Classification Search ............ 73/862.331–862.336, 862.24, 862.27; 290/1 R
See application file for complete search history.

(56) References Cited

U.S. PATENT DOCUMENTS

| | | |
|---|---|---|
| 6,341,534 B1 | 1/2002 | Dombrowski |
| 6,581,480 B1 | 6/2003 | May et al. |
| 6,779,409 B1 | 8/2004 | Kwun et al. |
| 7,131,339 B2 | 11/2006 | Kwun et al. |
| 7,256,505 B2 | 8/2007 | Arms et al. |
| 2001/0029792 A1 | 10/2001 | Garshelis |
| 2001/0035056 A1 | 11/2001 | Garshelis |
| 2002/0112913 A1 | 8/2002 | Chen et al. |
| 2004/0035222 A1 | 2/2004 | May |
| 2007/0051188 A1 | 3/2007 | Kwun et al. |
| 2007/0210738 A1 | 9/2007 | Khatib et al. |
| 2007/0215405 A1 | 9/2007 | Tsutsumi et al. |
| 2008/0154462 A1 | 6/2008 | Yamamoto |
| 2008/0257069 A1 | 10/2008 | Poirier et al. |

FOREIGN PATENT DOCUMENTS

JP    1985 60-044840 A1    3/1985

OTHER PUBLICATIONS

Herbst et al., J. Magn. & Magn. Mat., 1997, 183-196, 176(2-3).
Tlusty et al., Annals of CIRP, 1975, 21-25, 24(1).

*Primary Examiner* — Andre Allen
*Assistant Examiner* — Jonathan Dunlap
(74) *Attorney, Agent, or Firm* — Daniel M. Chambers

(57) ABSTRACT

Sensors for outputting signals indicative of a rate of change of torque experienced by a magnetized member in response to a change in torque experienced by the member are described. Such sensors include at least one sense element capable of detecting a change in a magnetic parameter of a magnetized region of the member positioned proximate to the sense element in response to a change in torque applied to the member. Devices for detecting and/or measuring rates of changes in or of torque that employ one or more of these sensors are also described, as are various applications for such devices.

16 Claims, 36 Drawing Sheets

SECTION E-E

SECTION E-E

SECTION F-F

DEVICES AND METHODS FOR DETECTING RATES OF CHANGE OF TORQUE

RELATED APPLICATION

This application claims the benefit of and priority to provisional application Ser. No. 60/883,780, filed on 6 Jan. 2007, and the non-provisional application Ser. No. 11/969,897 filed on 5 Jan. 2008, the contents of which are herein incorporated by reference in their entirety for any and all purposes.

FIELD OF THE INVENTION

This invention concerns sensors capable of detecting rates of change in or of torque experienced by magnetized components, or portions of components, of various machines.

BACKGROUND OF THE INVENTION

1. Introduction

The following description includes information that may be useful in understanding the present invention. It is not an admission that any such information is prior art, or relevant, to the presently claimed inventions, or that any publication specifically or implicitly referenced is prior art.

2. Background

Basic to the operation of modern machinery is the transmission of mechanical energy from source locations to points of utilization by means of rotating shafts transmitting torque. Beyond the nominal torques being transmitted, torque variations are ubiquitous in the rotating parts of machines. In addition to variations reflective of the actual function of the machine (e.g., impulse wrenches, rock crushers, etc.), major torque excursions also originate from kinematic features (e.g., oscillating or reciprocating parts), or inconstant rates of energy input or usage (e.g., as in piston engines, air compressors, etc.). Torque variation with rotational position arises in electrical machines from the needed presence of winding slots ("cogging" in machines having permanent magnet rotors) and commutation ("ripple" in brushless motors). Some sources of variational torque, such as those which arise on, or from the rotation of, ship propellers and helicopter rotors, are more subtle in that they arise simply from the variation with rotational position of the blade's proximity to the hull or fuselage. Moreover, all such active variational torques can stimulate torque oscillations at frequencies dependent on the dynamic relationship between inertia and elasticity within individual or interconnected rotating parts. Since the following factors mirror their causes: (i) the amplitude of torque variation, (ii) the spectrum of torque variation, (iii) timing of events affecting torque variation, and (iv) phase of torque variation relative to rotational position, it follows that sensing and measurement of only the variational torque components can often provide more detailed information concerning machine function than might be apparent from a measurement of torque alone, which is often dominated by its larger, more steady state components. This benefit is analogous to that obtained by using an accelerometer in an airbag sensor system to detect an impending crash, as opposed to a vehicle speed sensor which would not be able to detect a collision rapidly enough in the first place, and sometimes not at all due to the insufficient sensitivity to rapid velocity changes that an accelerometer is able to detect but a vehicle speed sensor is not.

In analogous fashion, torque variation can be fully characterized by its rate of change (ROC). The ROC signal has no features that directly reflect either rotational speed or torque magnitude. Continuous measurement of ROC in or of torque can provide sufficient information to identify specific torque producing events, recognize "signature" abnormalities, and signal the need for controlling action. While ROC information can, in principle, be obtained by differentiating a torque dependent signal, such an approach would fundamentally limit signal quality and frequency response in at least two ways. First, the frequency response of the base torque signal would be limited by the frequency response of the torque sensor system used. Second, the amplitude of variational torque measurable in the torque signal would be limited due to electrical noise present in the torque sensor signal or be hidden within the resolution of the torque sensor signal. Limitations of existing torque sensing technologies, such as frequency response limitations and the difficulty of obtaining an adequate resolution across the full range of torque measurement, have precluded their practical use for detecting rapid and/or small torque variations. Moreover, direct measurement of ROC provides greater sensitivity to rapid and/or small torque variations, thereby exposing detail that could be lost in the frequency response or noise limitations of more complex and more costly torque sensors.

Today, a variety of methods and devices exist for measuring torque on rotating shafts. These include elastic torque sensor systems which measure strain by use of strain gauges or phase shift measurement by way of angular position sensors but whose frequency response is generally limited to approximately 1 kHz at best, making their usage for detecting torque transients rather limited. Torque sensing methods further include magnetoelastic torque sensor systems that measure stress by monitoring the variation of stress-dependent magnetic properties such as permeability or magnetization. Such systems have either limitations on the frequency response or sensitivity/resolution of the measurement of the pertinent magnetic property, limiting their ability to detect small but rapid variational torque components.

It will become apparent in what follows that the ROC systems of the invention overcome such problems, in that:
(1) the frequency response of an ROC system is much greater than that of any existing torque sensor system;
(2) the detectable amplitude of a given variational torque is higher for higher frequencies in an ROC signal than that which can be practically obtained through a differentiated torque sensor signal
(3) small rapid changes in torque representing potentially very important diagnostic or control data, when observed in a torque sensor signal, are either not easily observable by measuring torque alone or not at all, but are detectable by measuring ROC in torque directly; and
(4) restrictions on types of transducer steels having magnetoelastic properties useful for use as the member carrying or subjected to a time-varying torque are far less stringent for ROC sensor systems than for magnetoelastic polarized band torque sensor systems, thereby providing ROC sensors with the combined benefits of high frequency response, ease of implementation, and lower cost.

ROC sensors for sensing torque variation provide the following additional benefits and advantages: they require no excitation power, they can withstand very high temperatures, and they are robust.

3. Definitions

Before describing the invention in detail, several terms used in the context of the present invention will be defined. In addition to these terms, others are defined elsewhere in the specification, as necessary. Unless otherwise expressly defined herein, terms of art used in this specification will have their art-recognized meanings.

An "array" refers to an organized grouping of two or more similar or identical components.

The terms "measure", "measuring", "measurement" and the like refer not only to quantitative measurement of a particular variable, for example, a rate of change in or of torque, but also to qualitative and semi-quantitative measurements. Accordingly, "measurement" also includes detection, meaning that merely detecting a change, without quantification, constitutes measurement.

A "patentable" process, machine, or article of manufacture according to the invention means that the subject matter satisfies all statutory requirements for patentability at the time the analysis is performed. For example, with regard to novelty, non-obviousness, or the like, if later investigation reveals that one or more claims encompass one or more embodiments that would negate novelty, non-obviousness, etc., the claim(s), being limited by definition to "patentable" embodiments, specifically exclude the unpatentable embodiment(s). Also, the claims appended hereto are to be interpreted both to provide the broadest reasonable scope, as well as to preserve their validity. Furthermore, if one or more of the statutory requirements for patentability are amended or if the standards change for assessing whether a particular statutory requirement for patentability is satisfied from the time this application is filed or issues as a patent to a time the validity of one or more of the appended claims is questioned, the claims are to be interpreted in a way that (1) preserves their validity and (2) provides the broadest reasonable interpretation under the circumstances.

The term "operably associated" refers to an operable association between two or more components or elements. For example, components of electrical circuits, devices, and systems are operably associated. In other words, an operable association does not require direct physical connection between specified components.

A "plurality" means more than one.

SUMMARY OF THE INVENTION

One object of this invention is to provide patentable sensors and devices that can detect rates of change in or of torque experienced by a member carrying or subjected to a time-varying torque, for example, a shaft, capable of transmitting torque between two parts of a machine, e.g., between an engine and a gearbox, between a gearbox and a rotor or propeller, etc. In general, a sensor according to the invention comprises a sense element configured to output an electrical signal (for example, a voltage) indicative of a rate of change in torque experienced by a mechanical component, i.e., a "member", carrying or subjected to a time-varying torque. The sense element is capable of detecting, sensing, or otherwise responding to time-varying changes in torque due to changes in one or more magnetic parameters of one or more magnetized regions of the member positioned proximate to the sense element.

The member carrying or subjected to a time-varying torque and sense element are proximately positioned so that the sense element can detect, sense, or otherwise respond to a change in a magnetic parameter of the member's magnetized region as a result of a change in torque applied to or otherwise experienced by the member. In preferred embodiments, the sensor also includes at least one of a processor operatively associated with the sense element and configured to process and/or interpret signals output from the sense element to determine a rate of change in torque experienced by the member and a memory operatively associated with the sense element and configured to store one or more data elements in the signal output from the sense element.

The member carrying or subjected to a time-varying torque itself may be magnetized in one or more regions; alternatively, or in addition, the member may include one or more rings or other parts rigidly mounted thereto that are magnetized over part or all of their length or circumference. Preferably, the magnetized region(s) of the member is(are) circumferentially magnetized. In preferred embodiments, the member carrying or subjected to a time-varying torque is itself magnetized in at least one region, i.e., the magnetized region(s), and at least one sense element according to the invention is disposed for sensing a change in the magnetic parameter(s) to be sensed with respect to the magnetized region. In particularly preferred embodiments, the member comprises a plurality of magnetized regions, which preferably are spaced from each other, and at least two of which are optionally magnetized in opposite directions.

A sense element is any configuration of an electrical conductor arranged to produce an electrical signal in response to a change in flux in which the conductor is disposed. In preferred embodiments, the sense element comprises a plurality of loops of an electrical conductor. Induction and solenoidal coils are particularly preferred classes of sense elements suitable for use in the context of the invention.

When assembled into a functional sensing device, the sensor(s) according to the invention are disposed in a housing adapted for the particular application. The housing preferably is configured to position the sense element(s) in spaced relation and proximate to the magnetized region of a mechanical torque-transmitting member. As will be appreciated, wiring, circuitry, control logic, and an energy source (e.g., a power supply such as a battery) will be included, with the understanding that the particular components and configuration of a given assemblage will differ depending on the particular application. Additionally, as those in the art will appreciate, a sensor may also include a plurality of sense elements. Also, in some embodiments, an array comprised of a plurality of sensors according to the invention, may also be deployed. Similarly, in some applications a plurality of different types of sensors, one or more of which is a sensor according to the invention, may be deployed, separately or as an integrated sensor array.

Another object of the invention relates to methods for sensing rates of change in torque. Such methods comprise exposing a member having a magnetized region to a time-varying torque and using a sense element according to the invention that has been positioned proximate to the magnetized region of the member to detect a rate of change in torque experienced by the member. The resulting data can be used for many purposes associated with the monitoring and/or control of various types of machinery including, without limitation, those containing one or more rotating parts.

Still other aspects of the invention concern energy harvesting and generating electricity, whereby a sense element according to the invention, such as an induction or solenoidal coil, is configured to output electrical energy in response to a change in torque applied to a member having a magnetized region positioned proximate to the sense element. Preferably, an electrical energy storage device, for example, a battery, a capacitor, etc., or combination of such energy storage devices, is electrically connected to or otherwise operably associated with the sense element in order to store harvested electrical energy.

Other features and advantages of the invention will be apparent from the following drawings, detailed description, and appended claims.

BRIEF DESCRIPTION OF THE DRAWINGS

This application contains at least one figure executed in color. Copies of this application with color drawing(s) will be provided upon request and payment of the necessary fee.

As those in the art will appreciate, the following detailed description describes certain preferred embodiments of the invention in detail, and is thus only representative and does not depict the actual scope of the invention. Before describing the present invention in detail, it is understood that the invention is not limited to the particular aspects and embodiments described, as these may vary. It is also to be understood that the terminology used herein is for the purpose of describing particular embodiments only, and is not intended to limit the scope of the invention defined by the appended claims.

DETAILED DESCRIPTION

A. Introduction

Figure 1:
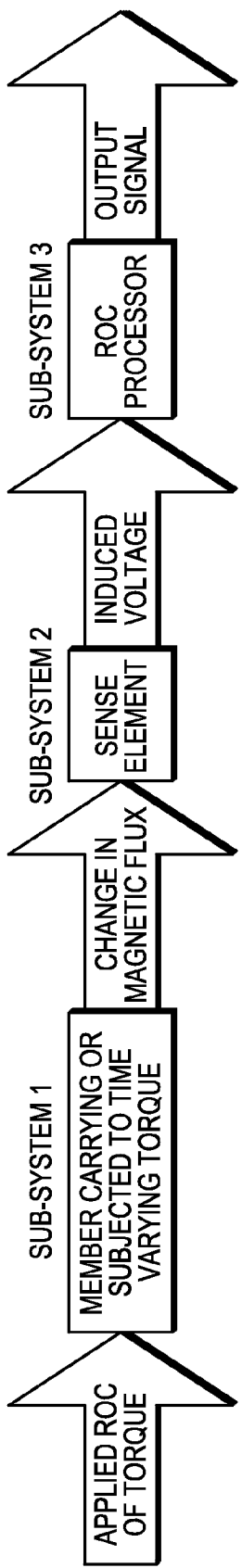
FIG. 1 is a system block diagram showing the measurement chain of an ROC sensor of the invention, identifying the subsystems and the various stages of signal flow.

The invention is based on the discovery that rate of change of torque data can be obtained by monitoring changes in one or more magnetic parameters, which data can then be used for a variety of purposes. While not wishing to be bound by any particular theory, the ROC sensors of the invention are believed to have a magnetoelastic operational basis analogous to that reported for polarized band-type torque sensors. While the physical source of the signal is believed to be the same (i.e., the tilting of a circumferential magnetization towards a helical orientation in response to the stress anisotropy arising with the transmission of torque), ROC sensors respond to the time rate of change of magnetic flux associated with the varying torque, rather than the intensity of the magnetic field which arises in the encircling space. Referring first to FIG. 1, an applied rate of change of torque results, through a circularly magnetized magnetoelastic member carrying or subjected to a time-varying torque (subsystem 1 in FIG. 1), in a change in magnetic flux. The change in magnetic flux results in an induced electrical signal, for example, a voltage, by way of a sense element (subsystem 2 in FIG. 1) that operates in accordance with the Faraday Effect. The optional ROC processor (subsystem 3 in FIG. 1) then interprets this voltage in order to provide an output signal.

There are several preferred embodiments of the member carrying or subjected to a time-varying torque (subsystem 1 in FIG. 1), including, but not limited to: (a) if the member is not ferromagnetic or magnetically active, a ring of material having suitable magnetic properties, and (b) if the member has suitable magnetoelastic properties, a shaft or portion of a shaft.

In the context of the invention, there are at least three preferred sets of embodiments of the sense element (subsystem 2 in FIG. 1): (a) a solenoidal coil-type pickup of axial flux variation associated with a region having remanent circular magnetization on the member carrying or subjected to a time-varying torque (b) a yoke-type pickup of axial flux variation associated with a region having remanent circumferential magnetization on the member carrying or subjected to a time-varying torque, and (c) a yoke-type pick up of axial flux variation with local circumferential magnetization that is established and maintained on the member carrying or subjected to a time-varying torque by the field from a straddling magnet.

The embodiments of the member carrying or subjected to a time-varying torque (subsystem 1 in FIG. 1) can be applied interchangeably with the embodiments of the sense element (subsystem 2 in FIG. 1)

Figure 2A:
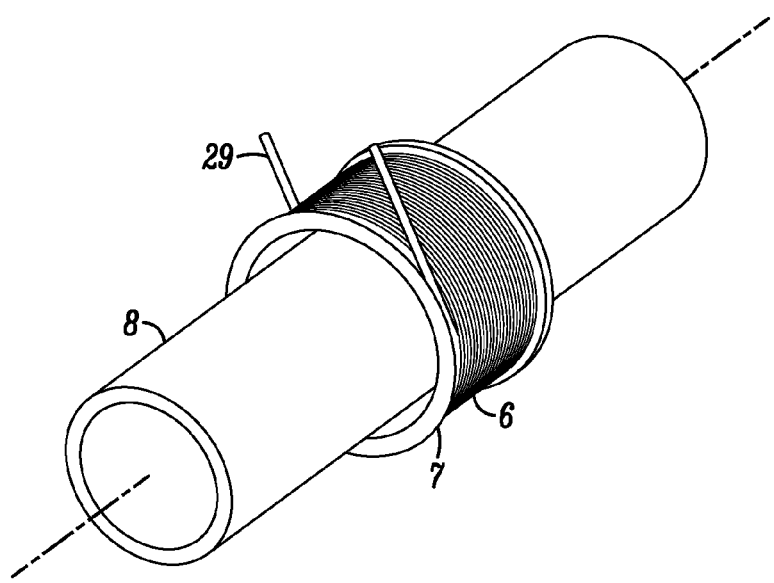
FIGS. 2(a), (b), and (c) are drawings showing the ROC sensor comprised of a shaft acting as the member carrying or subjected to a time-varying torque and a coil acting as the sense element of the present invention.
Figure 2B:
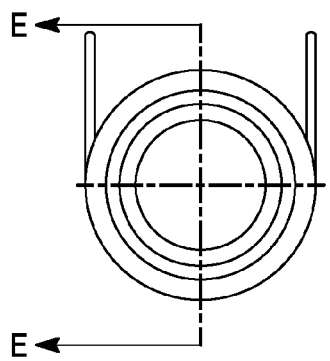
Figure 2C:
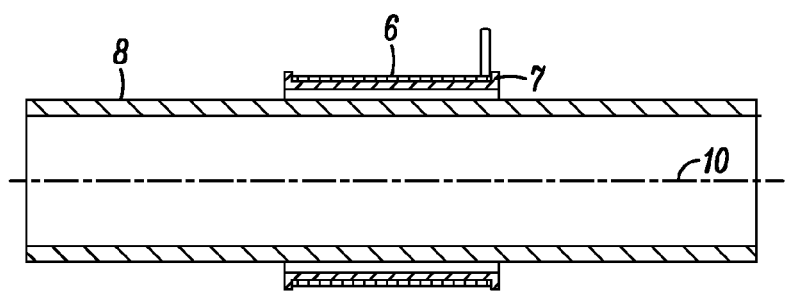
Figure 3A:
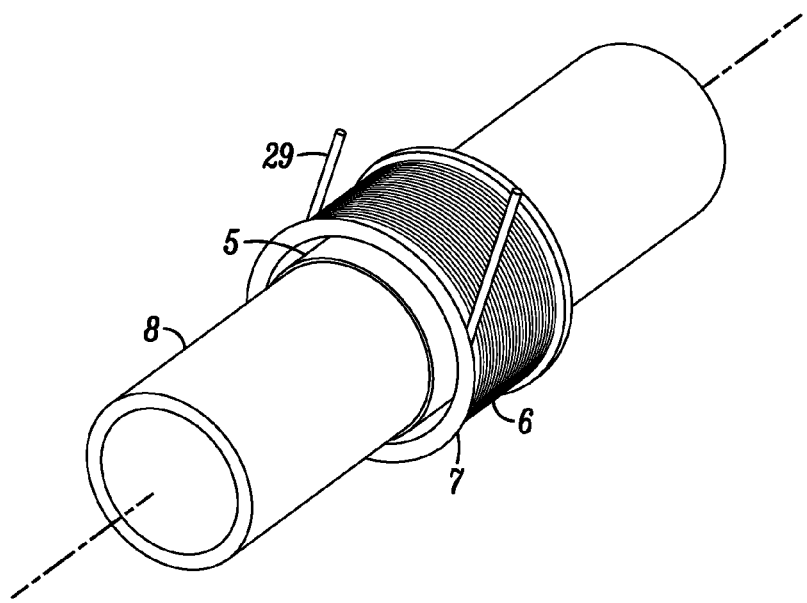
FIGS. 3(a), (b), and (c) are assembly drawings showing the ROC sensor comprised of a ring affixed to a shaft acting as the member carrying or subjected to a time-varying torque and a coil acting as the sense element of the present invention.
Figure 3B:
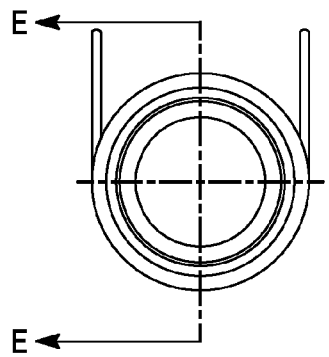
Figure 3C:
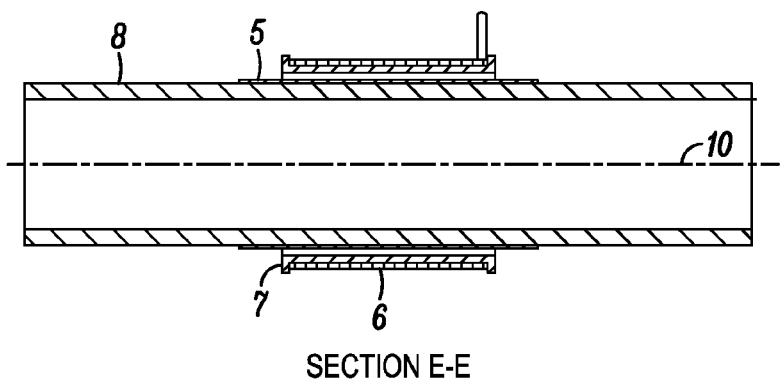

The first preferred set of embodiments, comprising a solenoidal coil encircling the region of a shaft having remanent circumferential magnetization, is shown in FIGS. 2 and 3. In FIG. 2, the shaft 8 constitutes the member carrying or subjected to a time-varying torque. In this case the shaft itself possesses the properties necessary for effective ROC transduction of rate of change of torque into a varying magnetic flux. For cases in which the member carrying or subjected to a time-varying torque does not have the requisite properties, the embodiment shown in FIG. 3 is used wherein magnetoelastic ring 5 is firmly attached to shaft 8, and ring 5 carries out the transduction of rate of change of torque into a varying magnetic flux. The sense element, denoted as Subsystem 2 in FIG. 1, is comprised in both FIG. 2 and FIG. 3 by solenoidal coil 6 having conductor leads 29 and supported by bobbin 7. In these embodiments of the ROC sensor, illustrated in FIG. 2 and FIG. 3, the quiescent (zero torque) magnetization usually is remanent and circumferentially uniform.

Figure 4A:
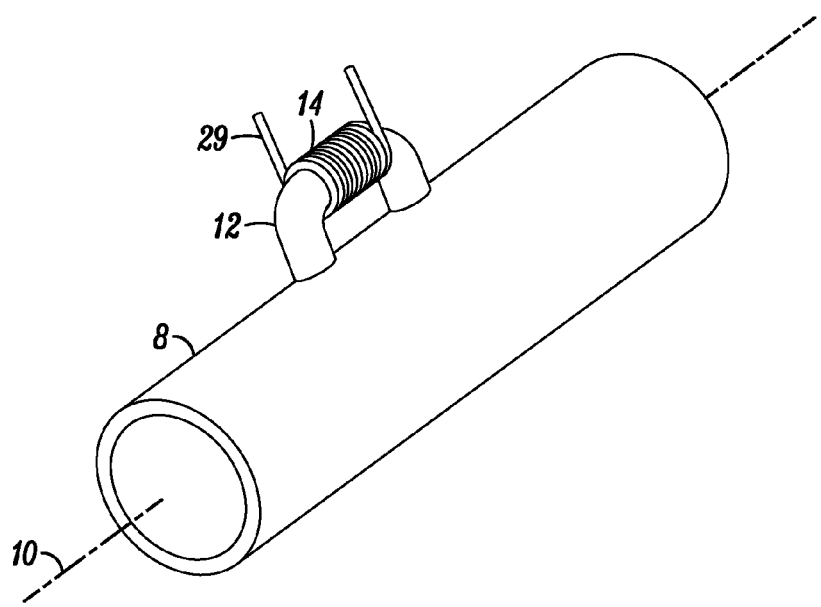
FIGS. 4(a) and (b) are drawings showing the sensor comprised of a permeable member having a coil proximate to the shaft acting as the sense element of the present invention.
Figure 4B:
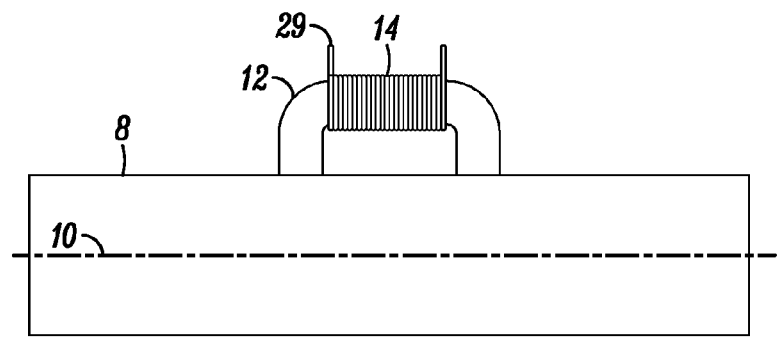
Figure 5A:
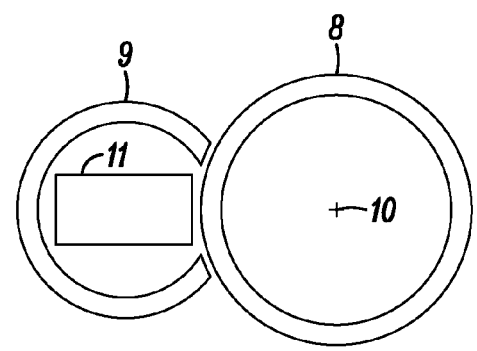
FIGS. 5(a) and (b) are drawings of an ROC sensor comprised of a permanent magnet (or electromagnet) oriented to magnetize an arcuately limited portion of the ROC sensing region located on a shaft which is the member carrying or subjected to a time-varying torque of the present invention.
Figure 5B:
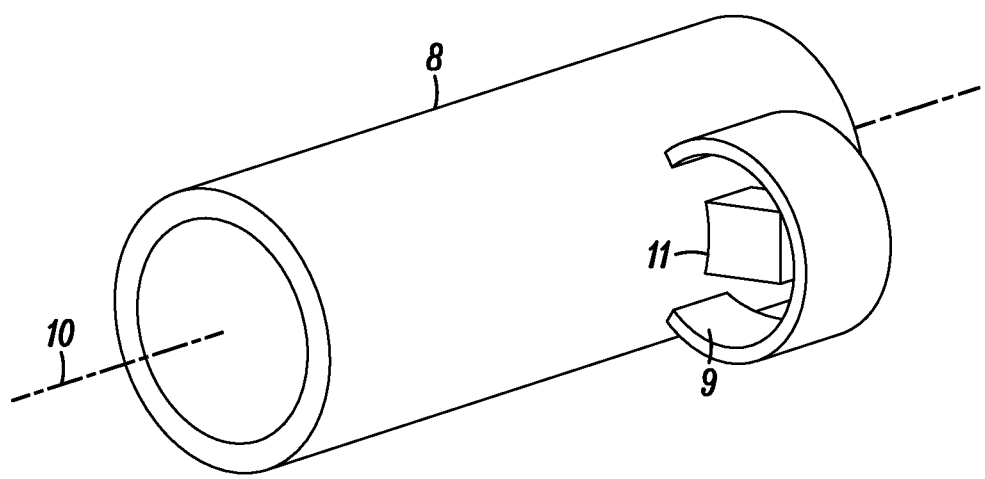
FIGS. 5(c), (d), and (e) are drawings of an ROC sensor analogous to that shown in FIG. 5(a) and FIG. 5(b) in which the sense element is comprised of a permeable member with coil.
Figure 5C:
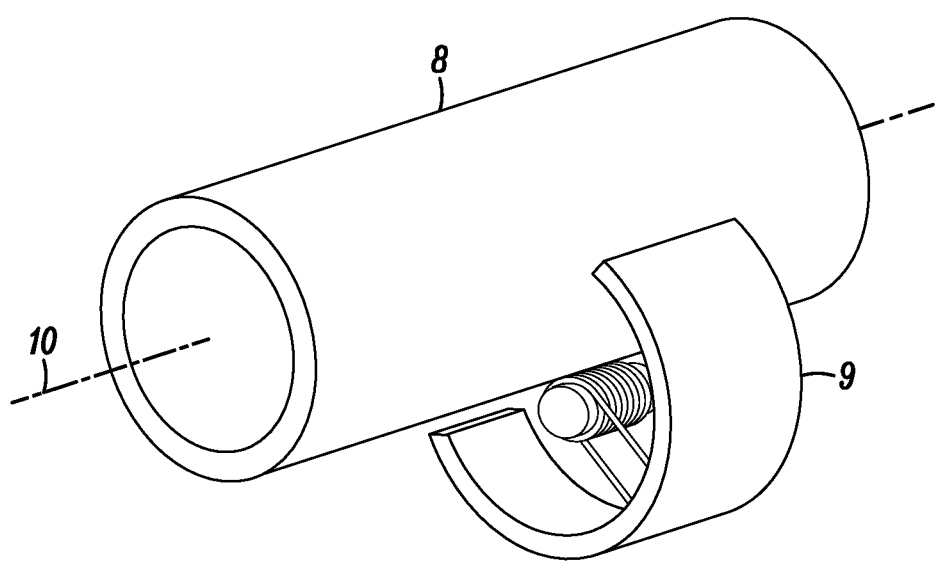
Figure 5D:
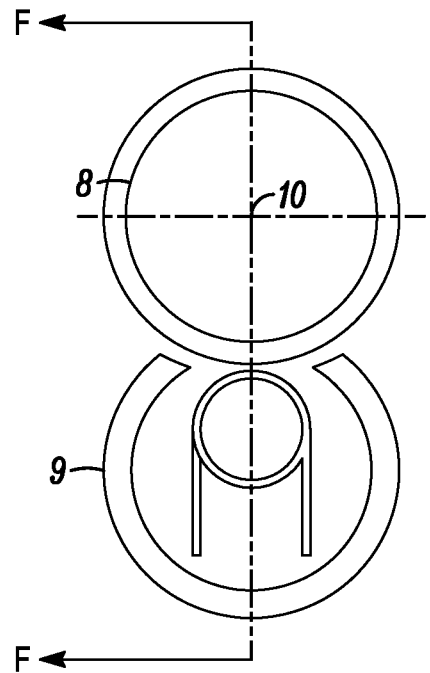
Figure 5E:
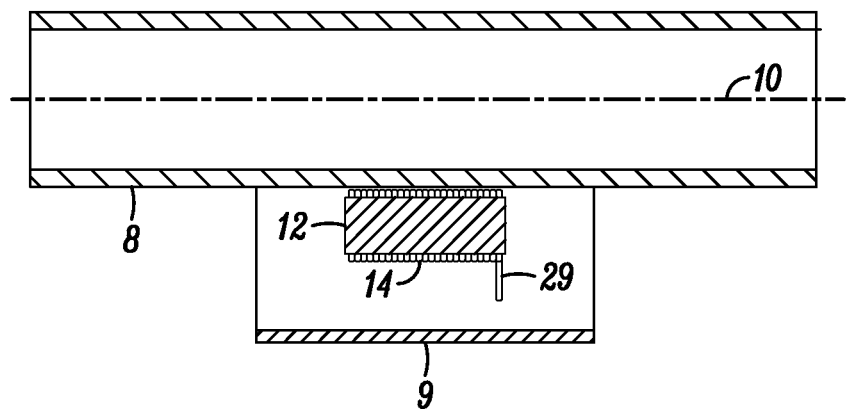

The second preferred set of embodiments, comprising a yoke-type pickup of axial flux variation with remanent circumferential band, is illustrated in FIG. 4, in which permeable member 12 with coil 14 (having conductor leads 29) constituting the sense element (subsystem 2 indicated in FIG. 1) are located proximate to shaft 8 (about its centerline axis 10) constituting the member carrying or subjected to a time-varying torque.

In the third preferred set of embodiments, shown in FIG. 5, the member carrying or subjected to a time-varying torque (corresponding to subsystem 1 in FIG. 1) is comprised by shaft 8 given a circular magnetization that is continuously instilled in the sensing region of the shaft by the field from a straddling magnet 9. The magnet acts to instill a circular magnetization within a limited arcuate portion of the sensing region on the shaft, which may or may not be rotating. This arrangement allows ROC signals to be obtained from a wider range of shaft materials than are suitable for other embodiments of the member carrying or subjected to a time-varying torque (because neither anisotropy nor coercivity are required to maintain a stable remanent magnetization). An example is shown in FIGS. 5(*c*), (*d*), and (*e*), whereby a permeable member 12 with coil 14 acts as the sense element.

Since the desired ROC information is often less a matter of absolute signal amplitudes than the relative timing of torque influencing events, or the search for variability in expectedly repetitive events, this configuration offers an attractive versatility in size and other practical, application related features.

Figure 6A:
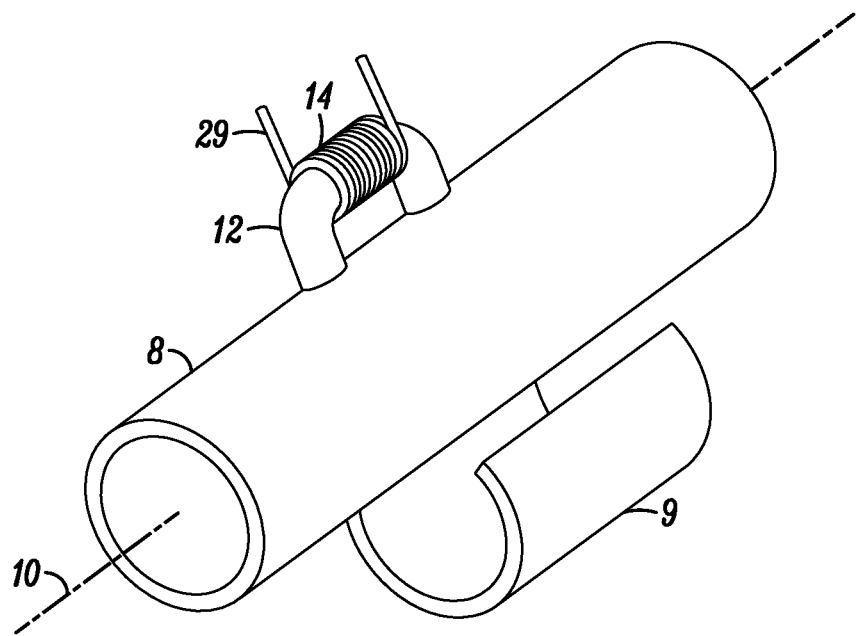
FIGS. 6(a), (b), and (c) are drawings showing an ROC sensor comprised of a permeable member having a coil acting as the sense element proximate to but not contacting a shaft configured to work in conjunction with a straddling magnet acting to maintain the circumferential magnetization of the member carrying or subjected to a time-varying torque of the present invention.
Figure 6B:
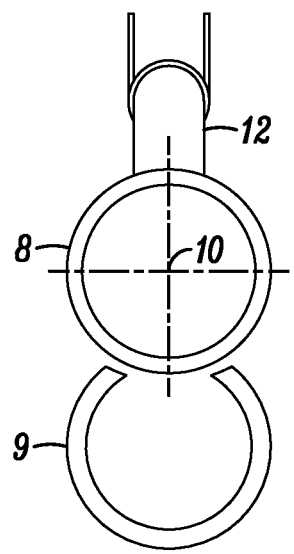
Figure 6C:
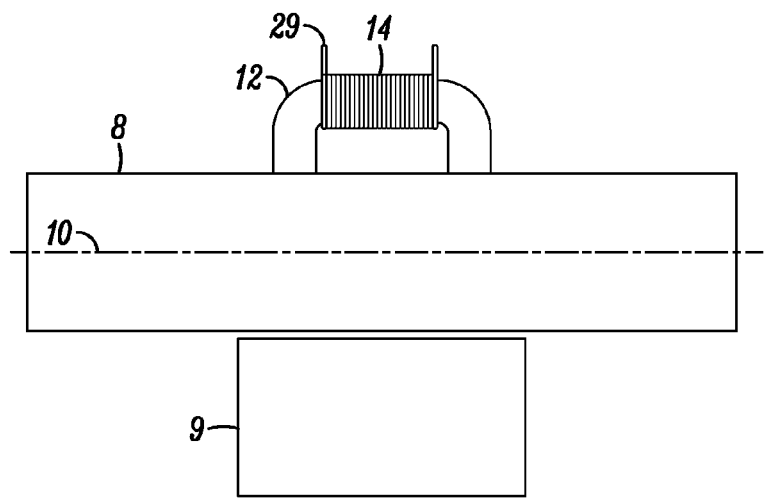

FIG. 6 illustrates a combination of the second and third sets of embodiments, whereby a straddling magnet 9 is used to maintain the circular magnetization of a rotating shaft in combination with permeable member 12 with coil 14 having conductor leads 29 acting as the sense element. Such configurations can be used to impart sufficient circumferential magnetization to materials that may not be well suited to maintain magnetization over prolonged periods.

Figure 7A:
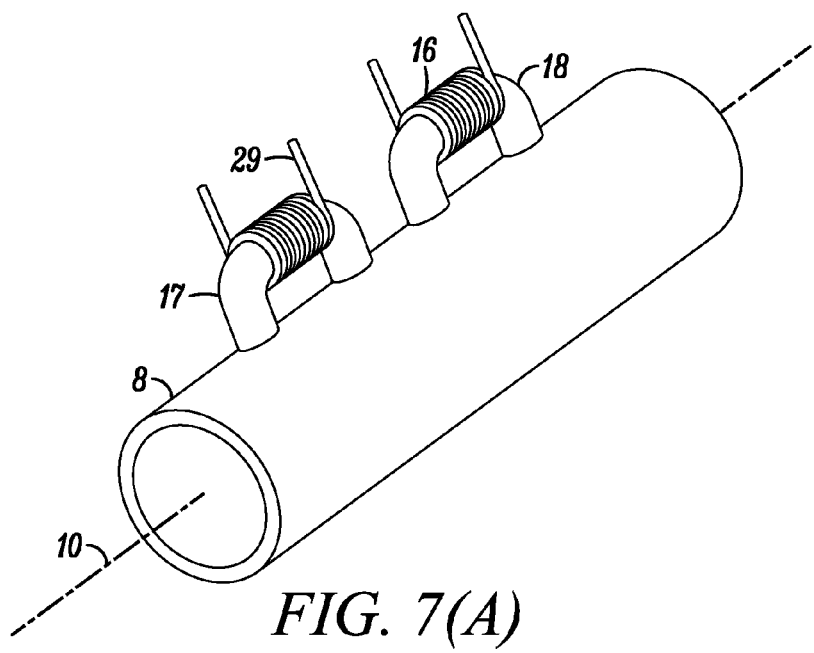
FIGS. 7(a), (b), and (c) are drawings showing an ROC sensor comprised of dual permeable members with coils acting as the sense element of the present invention proximate to but not contacting a shaft acting as the member carrying or subjected to a time-varying torque of the present invention.
Figure 7B:
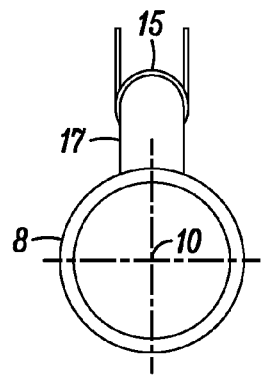
Figure 7C:
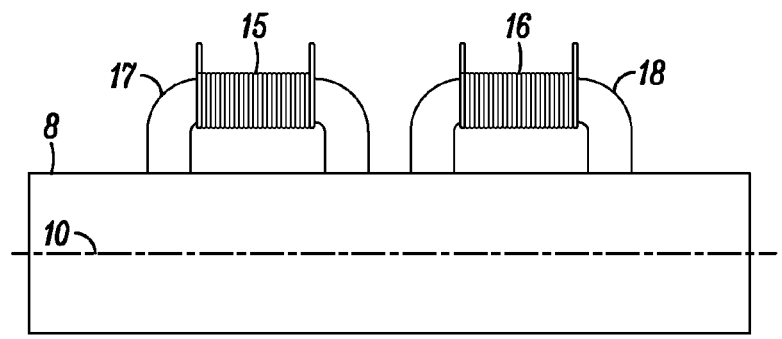
Figure 8A:
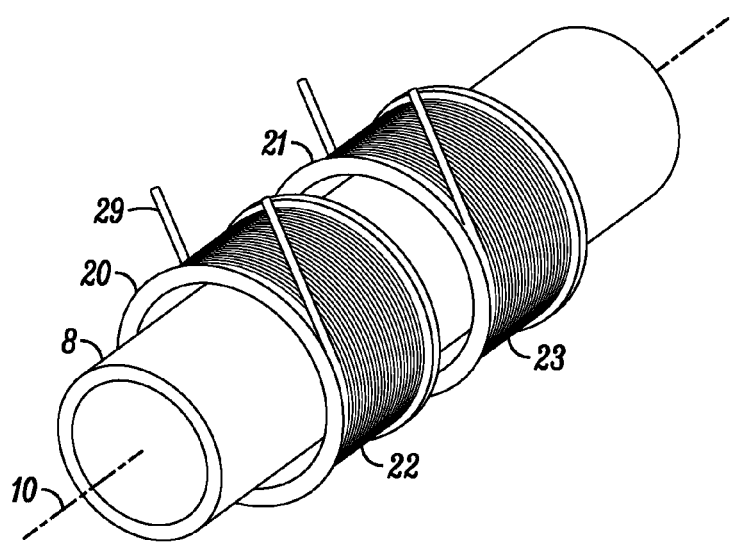
FIGS. 8(a), (b), and (c) are drawings showing an ROC sensor comprised of dual coils acting as the sense element of the present invention and with a shaft acting as the member carrying or subjected to a time-varying torque of the present invention.
Figure 8B:
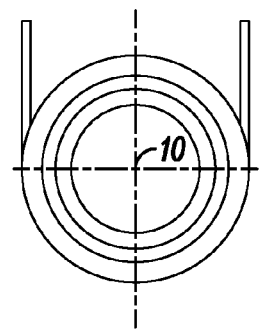
Figure 8C:
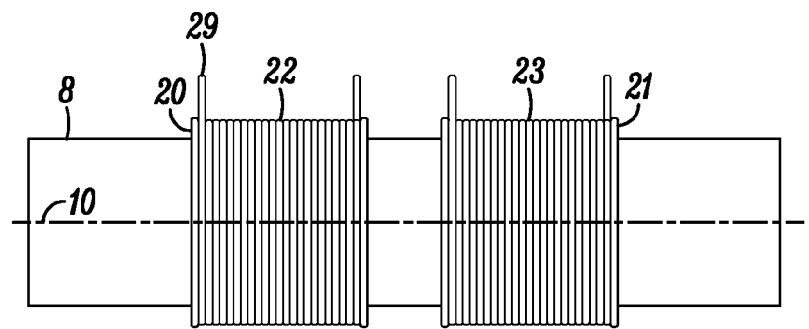

Another preferred set of embodiments, intended to detect a rate of change of torque in more than one sense element as created by the same or different sources of changing magnetic flux, is illustrated in FIGS. 7 and 8. In FIG. 7 there are two sets of permeable members 12 with coils 14 used to pick up the ROC signal. In FIG. 8 there are two solenoidal coils 22 and 23 mounted on supporting bobbins 20 and 21, respectively. Such embodiments could be used to obtain, without limitation, the benefits of common mode field rejection, redundancy, or superposition.

Figure 9A:
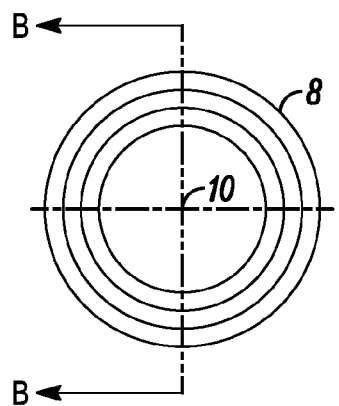
FIGS. 9(a) and (b) are drawings showing an ROC sensor consisting of dual coils acting as the sense element of the present invention located internally with respect to a shaft acting as the member carrying or subjected to a time-varying torque of the present invention.
Figure 9B:
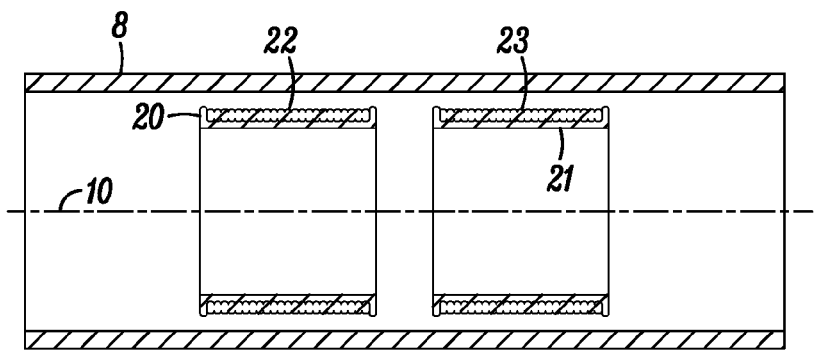
Figure 10A:
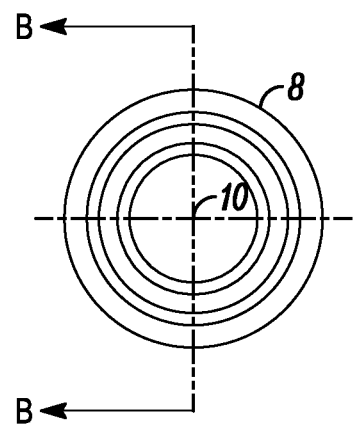
FIGS. 10(a) and (b) are drawings showing an ROC sensor comprised of a permeable member with a coil acting as the sense element of the present invention and mounted on a bobbin, located internally with respect to a shaft acting as the member carrying or subjected to a time-varying torque of the present invention.
Figure 10B:
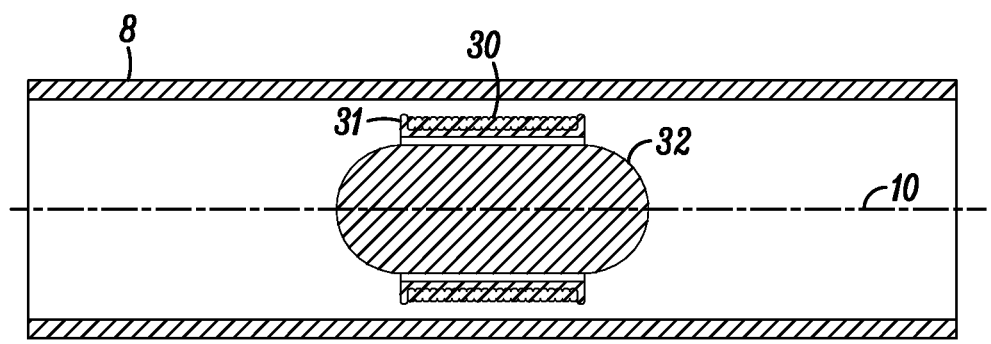

In yet another preferred set of embodiments, the sense element (subsystem 2 in FIG. 1) is located on the interior of the torque-carrying member (subsystem 1 in FIG. 1). Such an arrangement is shown in FIGS. 9 and 10. In FIG. 9 the sense element consists of dual solenoidal coils 22 and 23 mounted on bobbins 20 and 21 located internally with respect to the shaft 8. In FIG. 10 the sense element consists of permeable member 32 with coil 30 mounted on bobbin 31, all mounted internally to shaft 8.

Figure 11A:
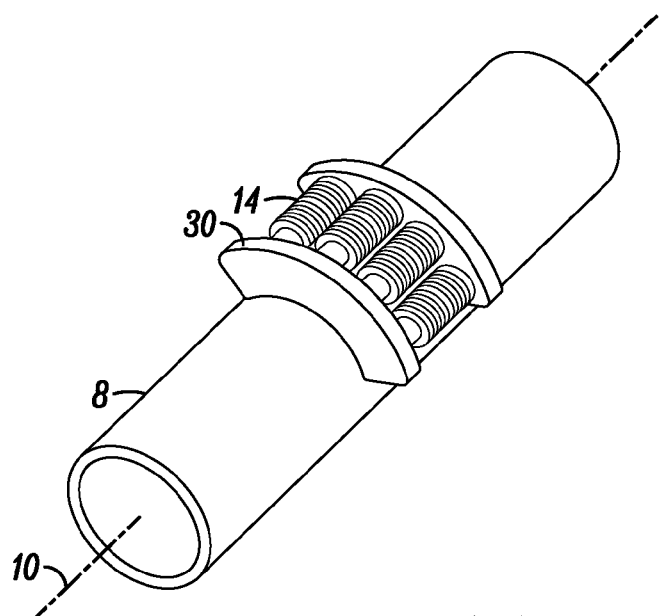
FIGS. 11(a), (b), and (c) are drawings showing an ROC sensor comprised of a plurality of permeable members with coils acting as the sense element of the present invention, mounted on a bobbin, located proximate to a shaft acting as the member carrying or subjected to a time-varying torque of the present invention.
Figure 11B:
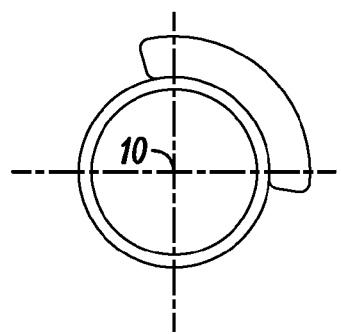
Figure 11C:
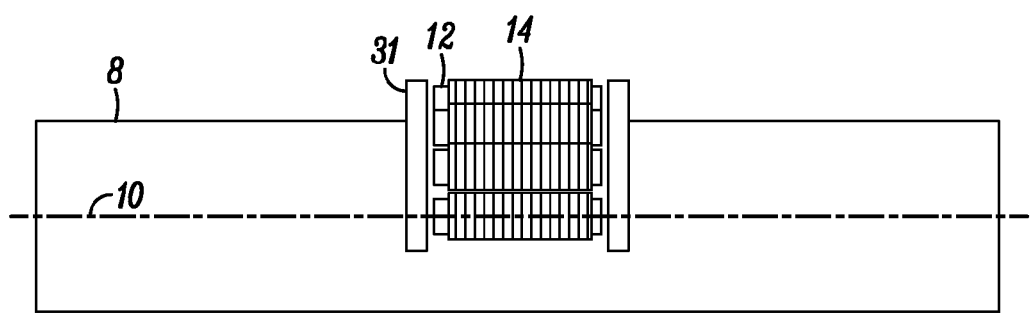

In yet another preferred set of embodiments, the sense element (subsystem 2 in FIG. 1) consists of a plurality of permeable members 12 with coils 14 supported on bobbins 30. Such an arrangement is shown in FIG. 11.

Figure 12A:
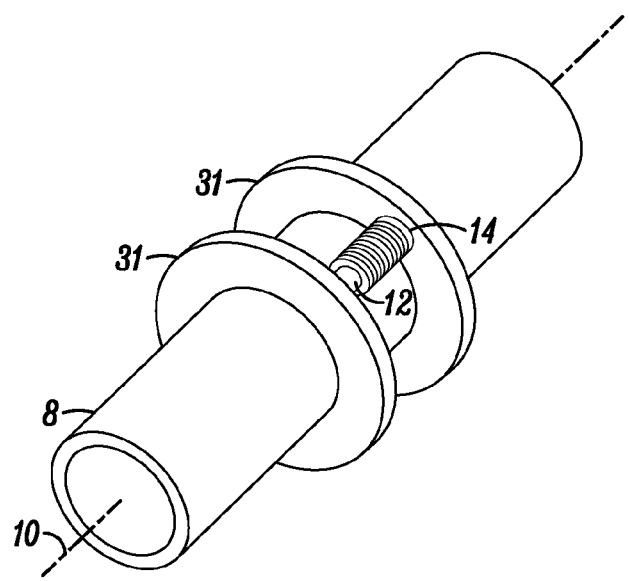
FIGS. 12(a), (b), and (c) are drawings showing an ROC sensor comprised of a permeable member having coil and adjacent pole pieces acting as the sense element of the present invention, located proximate to a shaft acting as the member carrying or subjected to a time-varying torque of the present invention.
Figure 12B:
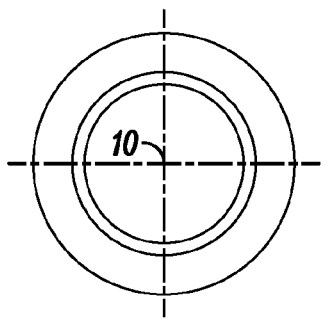
Figure 12C:
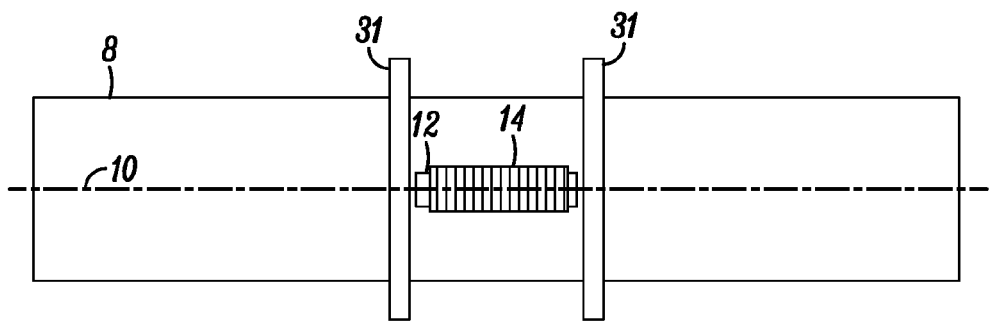

In yet another preferred set of embodiments, the sense element (Subsystem 2 in FIG. 1) consists of one or more permeable members 12 with coils 14 acting in conjunction with pole piece/flux concentrator 31. Such an arrangement is shown in FIG. 12.

Figure 13A:
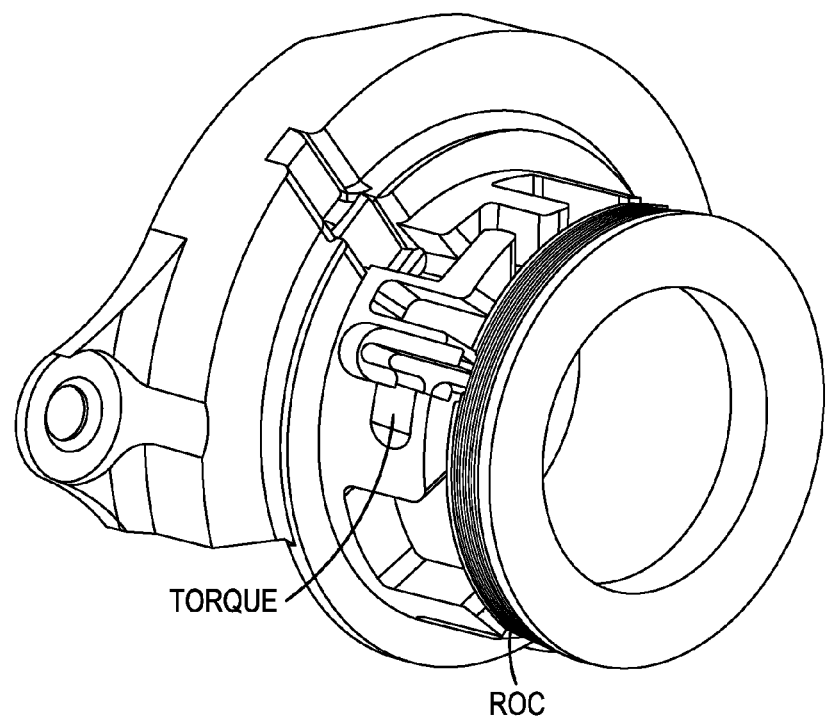
FIGS. 13(a) and (b) are drawings showing a combined ROC sensor and torque sensor wherein a coil acting as the sense element of the present invention is placed in the same enclosure as the sense elements of a polarized-band torque sensor.
Figure 13B:
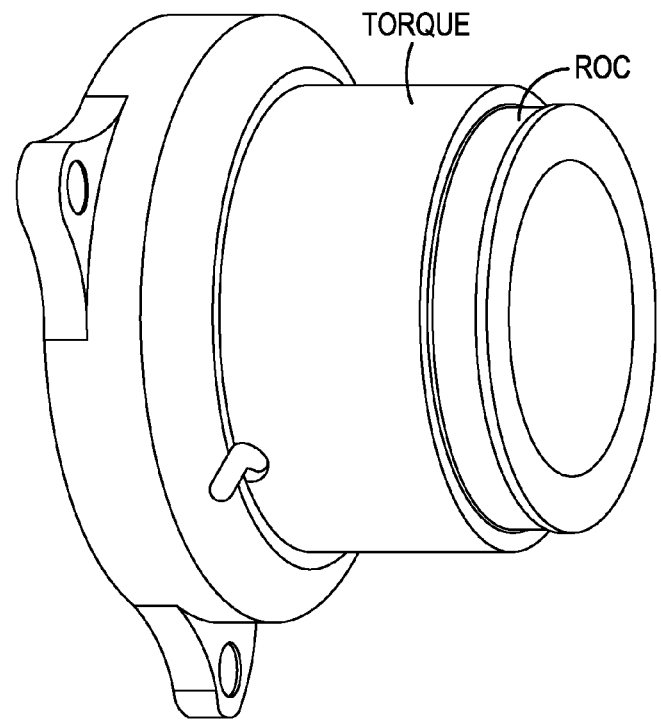

In yet another embodiment, the ROC sense element is housed in the same enclosure as the sense element of a magnetoelastic polarized-band torque sensor, thereby allowing for simultaneous measurement of torque and rate of change of torque in the same physical package. Such an arrangement is shown schematically in FIG. 13. Other embodiments include, without limitation, the housing of a torque, ROC, and/or speed sensor or speed sensing capability within the same enclosure, thereby allowing for simultaneous measurement of torque, rate of change of torque, and rotational speed of the member carrying or subjected to the time-varying torque.

Figures 14A, 14B:
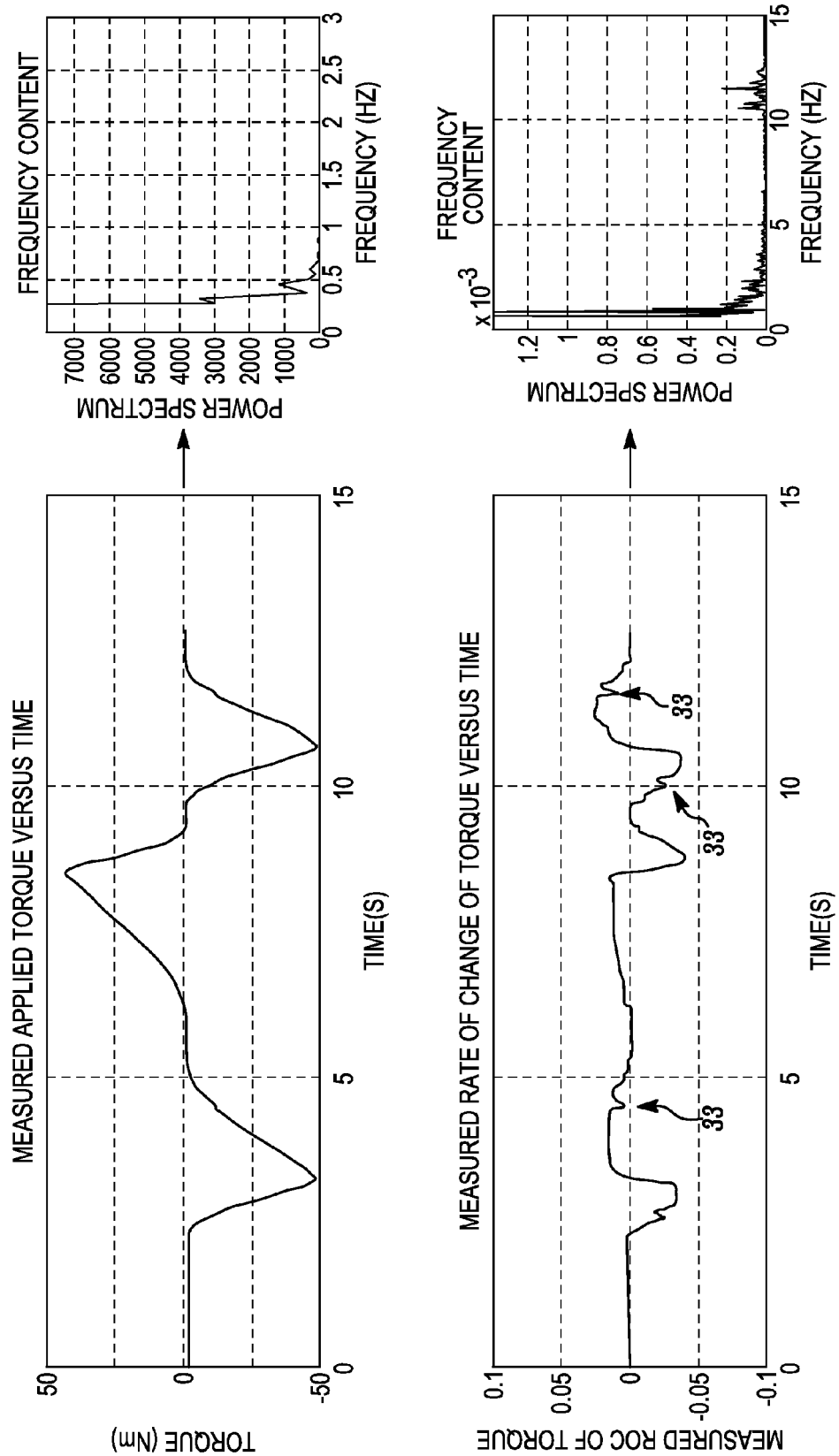
FIGS. 14(a) and (b) are graphs of torque and rate of change of torque in the time domain and frequency domain, respectively, showing the increased sensitivity of the ROC signal (lower plots) to higher-frequency, lower-amplitude torque variations than the torque signal (upper plots).

As described earlier, ROC information brings to light details of torque variation events that a regular torque sensor is generally unable to detect at all, or at times is only able to with reduced signal quality and thus informational content. FIG. 14 illustrates a simple example of the fundamentally different nature of the two signals. The upper plots represent time and frequency plots of cyclic application of torque on a rate of change of torque sensor having the basic construction illustrated in FIG. 2. The shaft, constructed of 300M alloy steel and having male-splined ends, was clamped between two female-splined fixtures connected to an electromechanical drivetrain capable of applying torque and including a reference instrument-grade torque sensor able to measure the applied torque. A 1000 turn coil was mounted about and coaxially with the shaft. Referring back to FIG. 14, a specific analysis of the zero-crossing points of the torque signal illustrates the value of the associated ROC signal. In particular, as the direction of torque is changing and thus the applied load is passing through zero, the ROC of torque undergoes a spike due to the sudden change in torque associated with the instantaneous disengagement and re-engagement of male and female spline teeth. In particular, inflection points 33 in FIG. 14(*a*) are indicated which show the distinctive feature of the ROC signal associated with physical engagement and disengagement of spline teeth during a change in direction of applied torque. FIG. 14(*b*) illustrates the higher frequency content present in the ROC signal (up to 13 Hz) as compared with the torque signal (less than 1 Hz).

It is interesting to note that oftentimes the very signals of interest, i.e., variation of torque during engagement or disengagement of mechanical components, occur at near-zero values of torque, i.e., in those portions of the measurement range at which resolution limits the accuracy of the torque signal.

B. Analysis: Member Carrying or Subjected to a Time-Varying Torque and Sense Element A simple, but suitably rigorous analysis can be readily made for a construction such as the one illustrated in FIG. 3 wherein a thin ferromagnetic ring constituting the member carrying or subjected to a time-varying torque (subsystem 1 in FIG. 1) of diameter, D, and wall thickness, w, is rigidly mounted on a paramagnetic or non-magnetic shaft. When transmitting a torque, T, the biaxial principal stresses, σ, at the outside surface are readily found from:

$$\sigma = \frac{16T}{\pi D^3}, \tag{1}$$

and within the ring/shaft combination, decrease linearly with radius to zero on the axis.

When transmitting T, there will arise within a ring, having an axial demagnetization factor, $N_D$ (determined by dimensions D and w), and of a material characterized by a circumferential uniaxial anisotropy, $K_u$, isotropic magnetostriction, λ, and in which a circumferential remanent magnetization, $M_r$, has been previously instilled, an axial magnetization component, $M_a$:

$$M_a = M_r \left( \frac{3\lambda\sigma}{2K_u + N_D M_r^2} \right). \tag{2}$$

For w<<D, both σ found from (1) and $M_a$ from (2) may be considered sufficiently constant over the ring cross sectional area, A (now≈πDw), for the axial component of flux, $\phi_a$, within the ring to be well approximated by $$\phi_a = 4\pi^2 M_r Dw \left( \frac{3\lambda\sigma}{2K_u + N_D M_r^2} \right), \tag{3a}$$

which in terms of T, found by substituting (1) in (3a), and after separating dimensional and material related parameters, becomes $$\phi_a = \frac{192\pi w}{D^2}\left(\frac{\lambda M_r}{2K_u + N_D M_r^2}\right)T. \quad (3b)$$

If the torque is varying with time, a close fitting, encircling coil of N turns, will link with some fraction, f, of $\phi_a$ and have induced therein an emf (electromotive force) found from $$e = fN\frac{d\phi_a}{dt}10^{-8} \quad (4)$$

$$= \frac{192\pi w f N 10^{-8}}{D^2}\left(\frac{\lambda M_r}{2K + N_D M_r^2}\right)\frac{dT}{dt}\text{volts}$$

C. Analysis: Processor
D.

Figure 30:
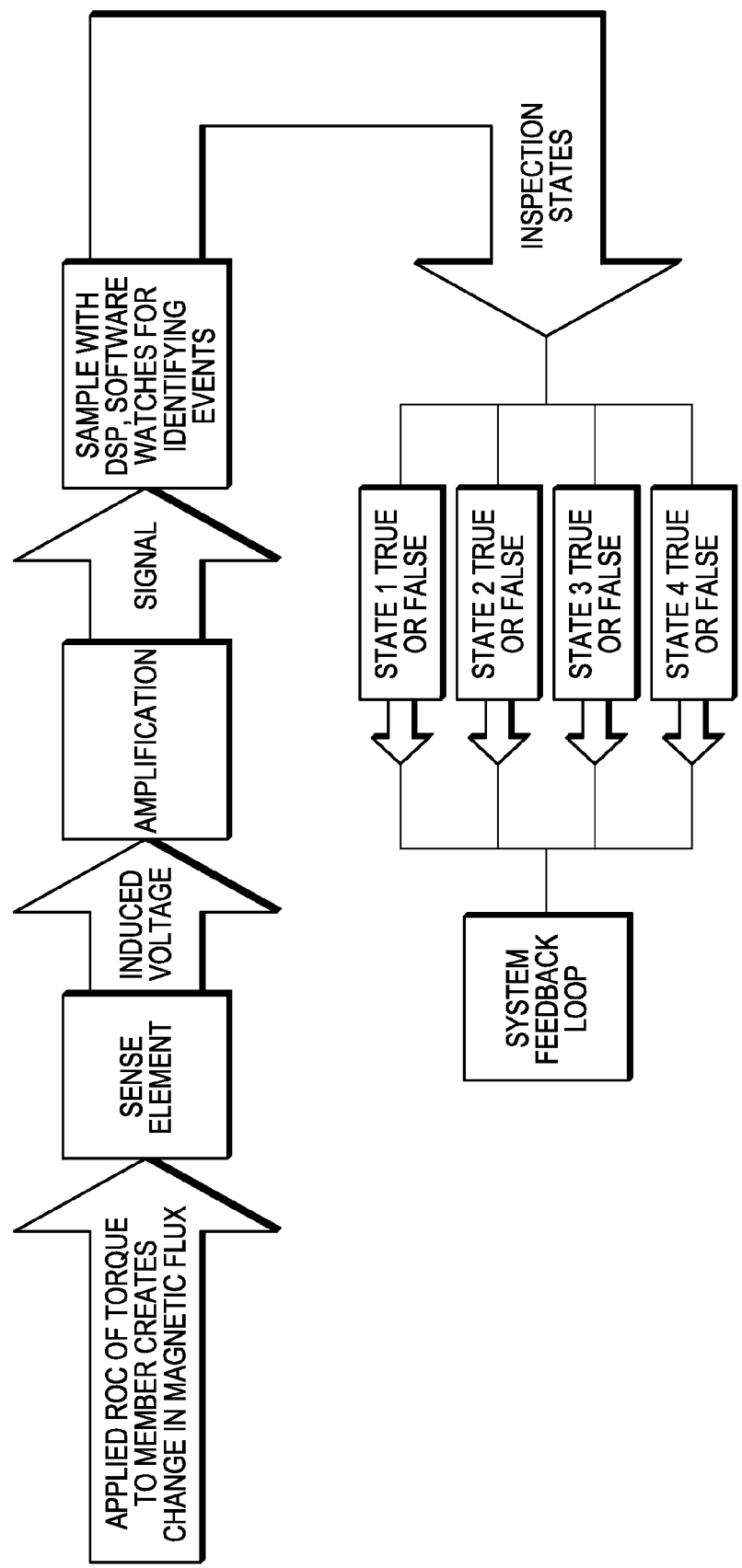
FIG. 30 is a block diagram describing how the ROC signal can be measured by a discrete signal processor (DSP) and used to identify certain events. This information could then be used by the system for control, diagnosis, and/or monitoring.

For many embodiments and specific applications, the processor (subsystem 3 in FIG. 1) is required to make the information obtained by the sense element (subsystem 2 in FIG. 1) useful for recognizing events and information relating to the variation in torque. For a majority of applications, without further interpretation and/or processing the member carrying or subjected to a time-varying torque and sense element alone are not sufficient to be used for system control, diagnosis, or monitoring. There are various embodiments of such a processor that can be envisioned. For example, as shown in FIG. 30, the signal induced by the sense element, preferably a voltage, is first amplified to be sampled by standard analog to digital converters; if only specific frequency ranges are of interest, filtering might occur at this stage as well. At this stage the processor could also carry out the functions of data interpretation and/or pattern recognition. Unlike many types of sensors, e.g., a pressure, temperature, or torque sensor, the salient information from an ROC sensor is most often not a single number which quantifies the measured parameter, but is rather a series of numbers (either discrete from sampled data, or continuous in analog form) which taken together, generally in groupings reflective of the specific application (e.g., two consecutive revolutions of a crankshaft, one revolution of a camshaft, or of a motor) form a pattern which, while possibly containing a single salient feature (e.g., a maximum, a minimum, a single frequency component) more likely contains a significant arrangement of details, the variation of which is the sought for information. Thus the signal can be sampled, for instance, with respect to inspection states as shown in FIG. 30. For example, a Digital Signal Processor (DSP) might be used to look for certain characteristics or patterns in the signal, and then supply a series of output flags or other descriptive data to be used as part of a feedback loop or system monitoring or diagnosis system. Examples of how this information can be used include, without limitation, indicating whether a clutch is engaged or not, based on the primary frequency components in the signal, or indicating whether or not there is an unacceptable amount degree of chatter on a machine tool, which chatter might in turn indicate that the surface finish on the part being manufactured by the tool will not meet a certain specification. More generally, the processor may act as a pattern or feature finder which extracts from the electrical signals information which can be used for, or is needed to establish that the machine or device on which the ROC device is installed is, or is not, operating according to expectations, needs or desires.

Figure 31A:
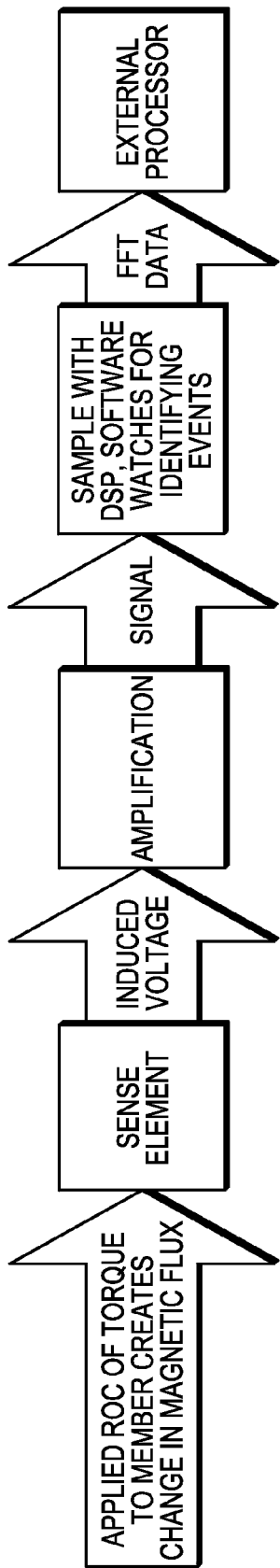
FIG. 31(a) is a block diagram demonstrating that the processor can be used to obtain the frequency components present in the ROC signal and pass the information in a reduced form, as is shown in the example in FIG. 31(b), to an external processor used for system control, diagnosis, and/or monitoring.
Figure 31B:
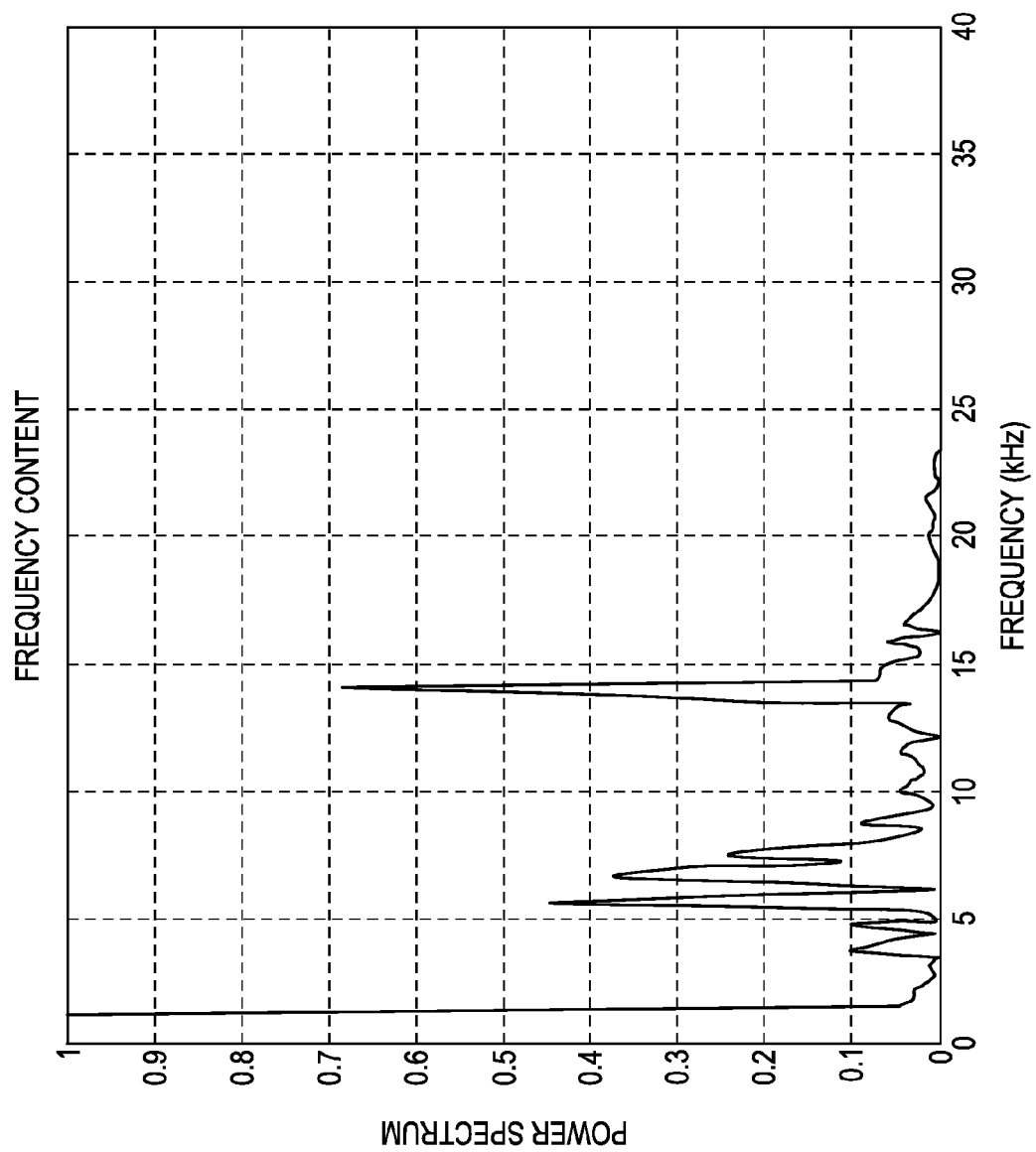
Figure 32:
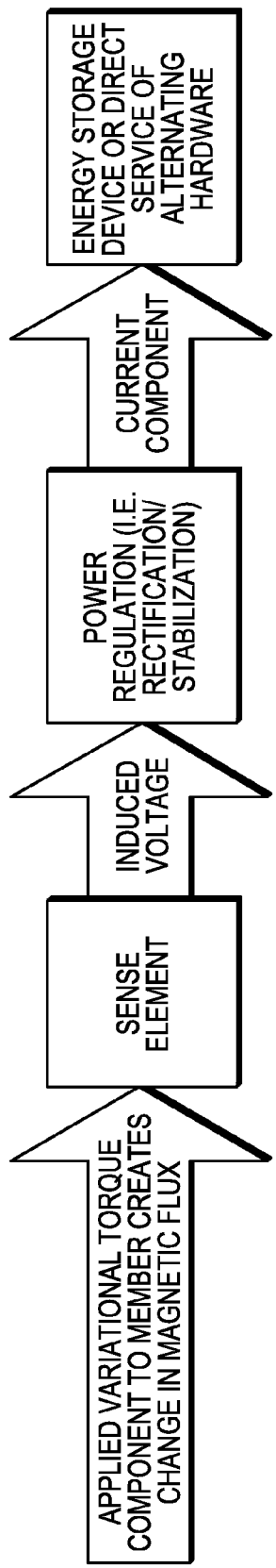
FIG. 32 is a block diagram showing that a power regulation system can be used to regulate the induced voltage from the sense element such that energy can be harvested from sense element and used for various purposes.
Figure 33:
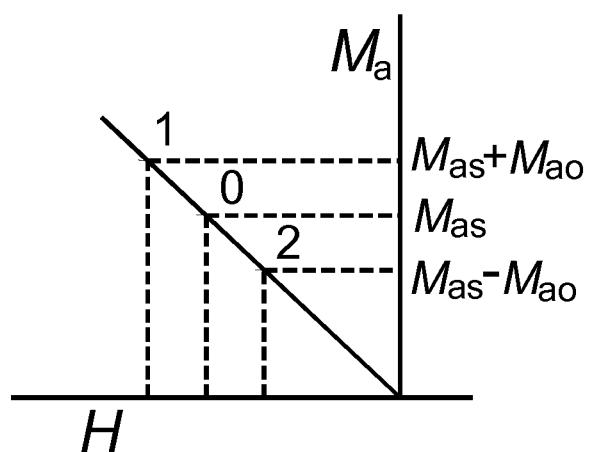
FIG. 33 plots axial magnetization versus H, a demagnetizing field.

In another embodiment an appropriately configured processor could be used to implement a data compression scheme. As the relevant information could be at frequencies beyond the sampling rate of the system responsible for recording the ROC sensor signal, the processor could also be used to compress the data through an FFT, for example, as is shown in FIGS. 31(*a*) and (*b*), or another suitable technique. The basic information about the frequency content might be passed at a significantly lower data rate than would otherwise be required, thereby increasing the range of practical applicability of the invention.

D. Analysis and Applications: Energy Harvesting

The sense element of the present invention can be used additionally as an energy harvesting device. Determination of the available energy may be estimated from analytical models used to describe the operation of the rate of change of torque sensor. Since the several known models follow the same general approach, and are based on the same underlying physics, their results are essentially equivalent. In the example that follows, the model was calculated according to the Herbst and Pinkerton method (J. Herbst and F. Pinkerton, Journal of Magnetism and Magnetic Materials, Vol. 176, No. 183 (1997)). While the derivation of this model was based on a thin ring of magnetoelastically active material mounted on a paramagnetic shaft, its use here for the analysis as a tubular ferromagnetic shaft is appropriate, since the remanently magnetized band has the geometric features of a ring and the axially adjacent unmagnetized regions, although of ferromagnetic material, having been heat treated for mechanical strength, are serendipitously magnetically hardened, and therefore exhibit relatively low permeability. The model is used in conjunction with experimental data to provide a value for the expected amplitude of the oscillatory component of the axial magnetization, $M_a$. The magnitudes and frequencies of the torsional oscillations used in this calculation were obtained from FFT analyses of data obtained during the dynamometer tests of a turboshaft engine's output shaft. Other parameters, both dimensional and material dependent, approximate those of the actual shaft used in those tests, are described in Table 1, below.

TABLE 1

PARAMETER VALUES FOR CALCULATIONS

| | |
|---|---|
| Shaft material | 300M aircraft grade ultra-high strength alloy steel (~5% alloying elements - principally Ni and Si) |
| Coercivity | 40 Oe (high enough to prevent adjacent regions of the shaft from being affected by the fields arising with the torque) |
| Easy axis Magnetostriction λ | 21 ppm |
| Saturation Magnetization $M_s$ | 1500 emu/cm$^3$ |
| Crystal Anisotropy $K_1$ (est.) | 380,000 erg/cm$^3$ (as against 450,000 for 100% Fe by the presence of Ni and Si) |
| Shaft outside diameter | 57.3 mm |
| Shaft inside diameter | 50.3 |
| Wall thickness | 3.5 mm (also assumed to be the radial thickness of the magnetized region) |
| Width of magnetized region | 57.3 mm (chosen to match the OD) |
| Peak operating torque | 3000 N · m |
| Surface shear stress at peak torque | 200 MPa |

TABLE 1-continued

PARAMETER VALUES FOR CALCULATIONS

| | |
|---|---|
| Peak to Peak oscillating torque | 10% of rated torque |
| Oscillating stress peak amplitude* | $0.05 \times 200 = 10$ MPa $(= 1 \times 10^8$ dynes/cm$^2)$ |
| Frequency of Oscillating Torque* | 200 Hz $\omega = 2\pi \cdot 200 = 1257$ rad/s |

*(while the oscillations under actual conditions have a complex wave form composed of a range of frequencies and amplitudes, their spectral distribution depends on application. Since the potentially induced emf is proportional to the product of frequency and amplitude, and commonly observed amplitude/frequency spectra show an inverse relationship between these two factors, the use of a single amplitude and frequency can be used for the purposes of this calculation.

Thus, in what follows, the oscillating stress is assumed to be sinusoidal at 200 Hz with an amplitude of 10 MPa.)

It should be noted that the predictions of the model are also conservative, since the process by which the magnetization tilts under stress is assumed to be solely by vector rotation against the anisotropy and demagnetizing field. This ignores the possible contribution to the tilt by displacement of 90° domain walls. Such walls almost certainly exist in remanently magnetized material having an isotropic distribution of cubic crystals with many easy axes, since the remanent magnetization is distributed over a solid cone having an apex angle of 110° (i.e., >90°). Wall motion in typical steels is a far less energetic process than rotation of the moment vector.

The demagnetizing factor $N_d$ for a magnetized region having the dimensions indicated (ID/OD=50.3/57.3=0.88, L/OD=1) is found to be: $N_d$=0.05(4π). The axial magnetization component at the surface, as a function of the surface stress, σ, and the above-identified parameters is shown in the analytical model to be:

$$\frac{M_a}{M_s} = \frac{a\lambda\sigma}{K_1 + bN_d M_s^2}. \qquad (5)$$

For an oscillating stress, σ sin ωt, the oscillating component of $M_{ao}$ is found from (5) as $$M_{ao}\sin\omega t = M_s\left(\frac{a\lambda\sigma_o \sin\omega t}{K_1 + bN_d M_s^2}\right) \qquad (6)$$

Herbst and Pinkerton (above) showed a=0.8986 and b=0.2126 for a shaft consisting of an isotropic distribution of bcc crystallites having many easy axes. This is the assumed structure of the shaft used in this example. Inserting these and the appropriate tabulated values into (6), using cgs units, $$M_{ao}\sin\omega t = 1500\left(\frac{0.8986 \times 21 \times 0.05 \times 2000\sin\omega t}{380,000 + 0.2126 \times 0.05 \times 4\pi(1500)^2}\right) \qquad (7)$$

$$= 1500\left(\frac{1887\sin\omega t}{380,000 + 300,556}\right) = 4.16\sin\omega t$$

While the stress (hence also $M_a$) clearly varies inversely with the shaft radius, and is therefore less at the inside diameter than at the outside, since the wall thickness is relatively thin, it is sufficient for the purposes here to consider it to be constant over the shaft cross section.

Since the demagnetizing field H associated with $M_a$ is equal to $-N_d M_a$, and the axial flux density $B=H+4\pi M_a = (4\pi M_a - N_d M_a) = (1-0.05)4\pi M_a$, the oscillating flux density is, $$B_o = 0.95 \times 4\pi \times 4.16\sin\omega t \qquad (8)$$

$$= 49.7\sin\omega t \text{ Gauss}.$$

The cross sectional area $(A)=(57.3^2-50.3^2)\cdot\pi/4=592$ mm$^2$=5.92 cm$^2$, from which the oscillatory flux $\phi_o=B_o A=294$ sin ωt. The rate of change of this oscillating flux is: $d\phi/dt=d(B_o A)/dt=294$ ω cos ωt. Since for 200 Hz, ω=2π×200=1257, $$d\phi/dt=294\times1257 \cos 1257t=369,558 \cos 1257t. \qquad (9)$$

A solenoidal coil encircling the magnetized region of the shaft is the simplest electromagnetic configuration to convert the energy associated with the oscillating component of $M_a$ into electrical energy. For example, the changing flux of equation (4) linking a 1000 turn coil encircling the magnetized region of the shaft will induce an open circuit emf, e, as follows:

$$e = 1000 d\phi // dt \times 10^{-8} \text{ Volts} \qquad (10)$$

$$= 3.69\cos 1257t \text{ volts}.$$

If the magnetic circuit includes a ferromagnetic toroidal "yoke" encircling the coil, with minimum radial air gaps separating its ends from the shaft, the emf of (10) can be significantly raised. This is readily seen from the model, since the yoke will effectively reduce $N_d$, thereby reducing the second term in the denominator of (7), resulting in a higher value of $M_a$ and (with modest additional improvement from a reduction in H) an increase in the amplitude of the time varying flux. The available energy is preferably sufficient to perform the envisioned measurement and data transmission functions.

The energy available is readily determined by realizing that the magnetized band is effectively a tubular "permanent" magnet having the diametral dimensions of the shaft and an axial length equal to the width of the magnetized region. Unlike in a real permanent magnet, however, the intensity of the axial magnetization, $M_a$, is modulated by the stress (torque). In the absence of yokes or other close fitting external ferromagnetic members, the permeance of the magnetic circuit is fixed by the dimensions of the band and is determined by $N_d$. The oscillating component of the torque causes the magnetization, together with its demagnetizing field, to rise and fall above and below any steady state component associated with the average torque. This is indicated in the figure below, where $M_{as}$ is the steady state component of $M_a$ and $M_{ao}$ is the oscillating component.

The magnetic energy density E of the magnet is being cyclically varied by the oscillating stress. E varies over each oscillating torque cycle from $E_0 \rightarrow E_1 \rightarrow E_0 \rightarrow E_2 \rightarrow E_0$. The energy density of any magnetized body is found from:

$$E=\int H dM_a,$$

which, here, where $H=N_d M_a$, becomes simply, $$E = \frac{1}{2}N_d M_a^2.$$

The total energy W is E×V (V is the volume of the magnet, in this case, the volume of the magnetized band on the shaft). The available power is obtained from the rate of change of the total energy. For the present example, the peak to peak change in energy density is found from $\Delta E = 2(0.5 \times 0.05 \times 4\pi \times 4.16^2) = 10.87$ ergs/cm$^3$, from which the total oscillating change in energy is found as:

$$W = 10.87 \times 5.92 \times 5.73 = 369 \text{ ergs}.$$

From which the power P is readily determined as $$P = dW/dt = \omega W = 1257 \times 369 = 463{,}833 \text{ ergs/s} = 46.4 \text{ mW}.$$

The calculation above results in a value of stored power that is significant enough in magnitude to indicate usage of the sense element of the present invention as an energy harvesting device as a practical and useful embodiment. Energy harvesting using an EMF induced in a sense element produced by a variational torque component can be used to construct a system that allows for a fully wireless self-powered torque sensor, rate of change of torque sensor, or energy source for other systems which may otherwise be limited by the need for cabling and harnesses. Such fully wireless self-powered sensors lend themselves to arrangements wherein the energy associated with natural variations in the torque on magnetized shafts may be harvested to provide the electrical power required to both perform the measurement functions (e.g., sensing rates of change in torque, integrating torque levels from rate of change in torque data, etc.) and to wirelessly transmit a signal containing the measurement data to a nearby receiver. Implementation of sensing arrangements of this type would eliminate the need for cabling, associated harnesses, and connectors, and reduce the need to provide access to the system for inspection and/or repair of such items.

E. Applications: Engines

By anticipating the torque variation, real time ROC signals can serve in closed loop control to affect its minimization or to abort or shut down components deemed by the ROC processor to be subject to imminent failure or overload. Such small and rapid variations constitute those very details of the variational torque signature which are most telling of the causes underlying these variations, and thus likely the most useful for control.

Such usage of the signal is particularly interesting when one considers the extremely limited timeline available for shut-down or other torque-mitigating control action. In some instances within a matter of milliseconds, the control system must actuate with what currently is a non-ideal set of sensor inputs that provides relatively delayed and limited information to act upon. The ROC sensor opens new possibilities to act in time in such situations.

ROC sensors have been successfully tested on automotive powertrain dynamometers where their signals have clearly indicated each engine firing event and shown the absence of such when the test included deliberate misfires. This information is particularly useful when diagnosing and/or tuning the details of engine operation, such as air/fuel ratio, chronometrics of spark timing, mapping of throttle position with engine speed, and individual cylinder pressures for example. The ROC sensor has the benefit of being able to withstand relatively high temperatures, such as those found in spark-ignition (internal combustion) and/or gas turbine engines, thanks to the simple construction and high temperature capability of various embodiments of the sense element.

Figure 15:
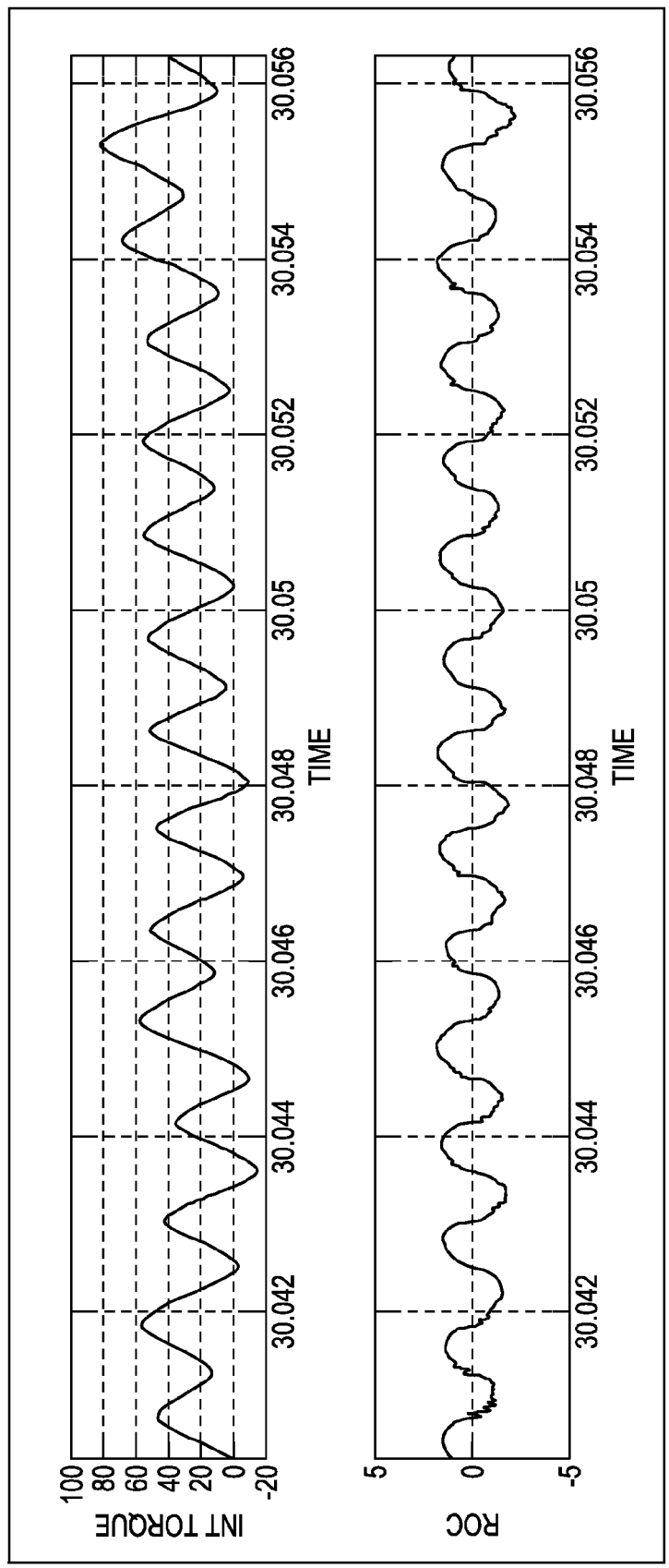
FIG. 15 is a plot of torque (upper plot) and rate of change of torque (lower plot) on an automotive engine output shaft rotating at 15,000 rpm (revolutions per minute) examining a 16 ms (millisecond) duration, in 2 ms intervals, showing that individual changes in torque of the individual cylinders firing can be clearly distinguished.

Referring to FIG. 15, the same system pertaining to FIG. 14 was subjected to dynamic torque loading by an automotive internal combustion engine. FIG. 14 shows torque (upper plot) and rate of change of torque (lower plot) on an engine output shaft (clutch shaft) spinning at 15,000 rpm during a 16 ms duration, in 2 ms intervals. The upper torque plot was obtained by integrating the ROC signal. It can be seen from this data that the individual changes in torque associated with the firing of the individual cylinders can be easily distinguished. Beyond the functions mentioned above, such an ROC signal could complement or help validate existing cylinder-pressure measurement.

Figure 16:
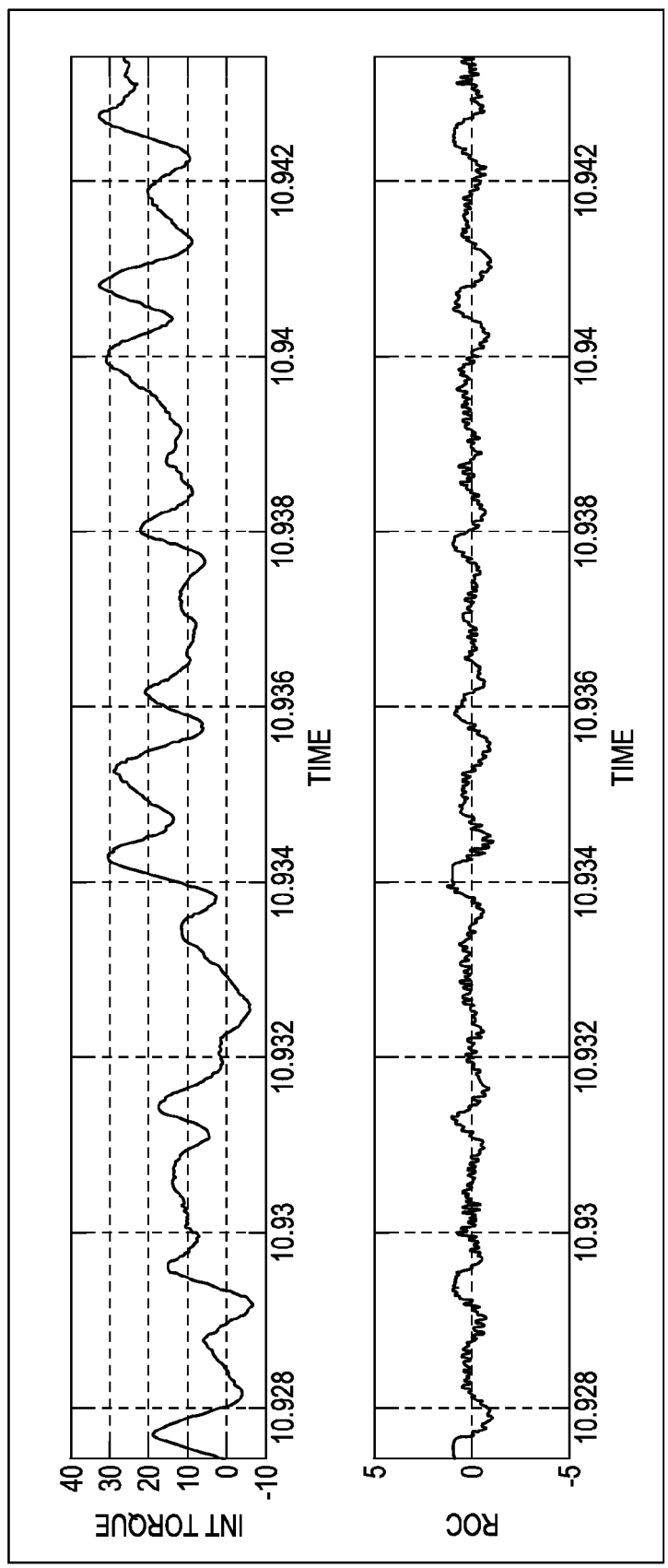
FIG. 16 is a plot of torque (upper plot) and rate of change of torque (lower plot) on an automotive engine output shaft rotating at 18,000 rpm examining a 16 ms duration, in 2 ms intervals, showing an anomalous oscillation as compared with the 15,000 rpm data sample shown in FIG. 15 and thereby illustrating the value of the ROC signal in detecting and diagnosing torsional oscillations.

Referring to FIG. 16, which shows torque (upper plot) and rate of change of torque (lower plot) on the same engine output shaft pertaining to FIG. 15 spinning at 18,000 rpm examining a 16 ms duration, in 2 ms intervals, the signature of the ROC signal suggests an anomalous oscillation as compared with the 15,000 rpm data sample shown in FIG. 15.

Figure 17:
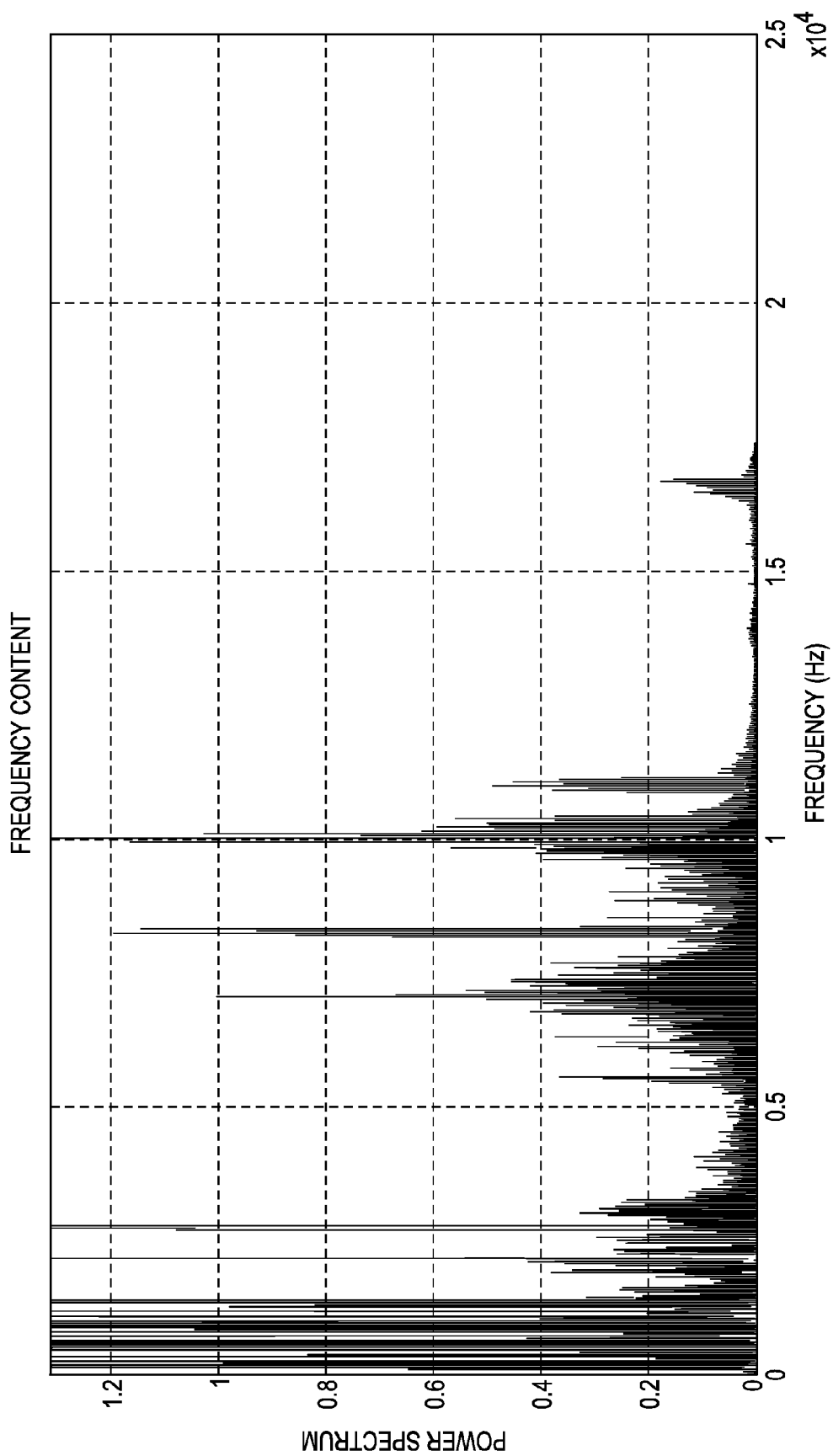
FIG. 17 is a frequency plot of ROC data recorded on an automotive engine output shaft, showing frequency content even at above 11kHz for one of the data sets recorded and 17 kHz for the other data set recorded.

A further example of the interesting features of the ROC signal is shown in FIG. 17, in which the frequency content of the ROC signal acquired during two separate engine data runs is displayed. The different colors denote two separate portions of constant-acceleration regions, although at different speeds and in different gears. Notice that informational content is significant in this graph up to frequencies as high as 17 kHz. Clearly the very high frequency response of the ROC sensor is of value, since conventional torque sensors have frequency responses of 5 kHz at most.

Application of an ROC sensor of the invention to automotive engine control applications includes, without limitation:

A. comparison with and possible elimination of in-cylinder pressure sensors;

B. analysis of ROC as a function of wheel slip in the frequency domain, in order to optimize traction control algorithms; and C. analysis of individual cylinder firing events, in conjunction with or to the exclusion of the in-cylinder pressure or other signals, including diagnosis of misfire or knock.

F. Applications: Clutches and Transmissions

ROC sensors according to the invention have been successfully tested on automotive powertrain dynamometers where their signals have clearly indicated a wealth of information with respect to engine-to-transmission coupling through the clutch, details of clutch engagement disengagement, chronometrics and quality of gear shift, and the state of health of gears, rolling element bearings, shift mechanisms, shafts, and other powertrain components. This information is particularly useful when diagnosing and/or tuning the details of transmissions and their associated control systems, such as those used in modern automobiles having semi-automatic transmissions whereby the driver requests a gear shift but the onboard control system carries out the shift.

Application of an ROC sensor of the invention to clutch monitoring and/or control applications includes, without limitation:

A. Monitoring of ROC during launch in order to more accurately determine the clutch bite point and to more accurately monitor and ultimately more rapidly control torque transfer through the clutch; and B. Monitoring of ROC signature during actuation to detect impending damage and/or degree of wear to the clutch, or diagnose clutch popping.

Application of an ROC sensor according to the invention to transmission monitoring and/or control applications includes, without limitation:

A. Monitoring of ROC during gearshifts in order to detect the optimal point for gear extraction and re-insertion during upshifts and downshifts;

B. Monitoring ROC in order to provide additional data to assist in avoiding drivetrain resonant frequencies; and C. Monitoring ROC in order to evaluate individual gear tooth engagements and disengagements D. Usage of ROC signal to predict wheel slip error, as an aid in tuning an "analog" traction control systems E. Monitoring of ROC to evaluate the state of health of gears, rolling element bearings, shift mechanisms, shafts, and other components in a transmission.

Figure 18A:
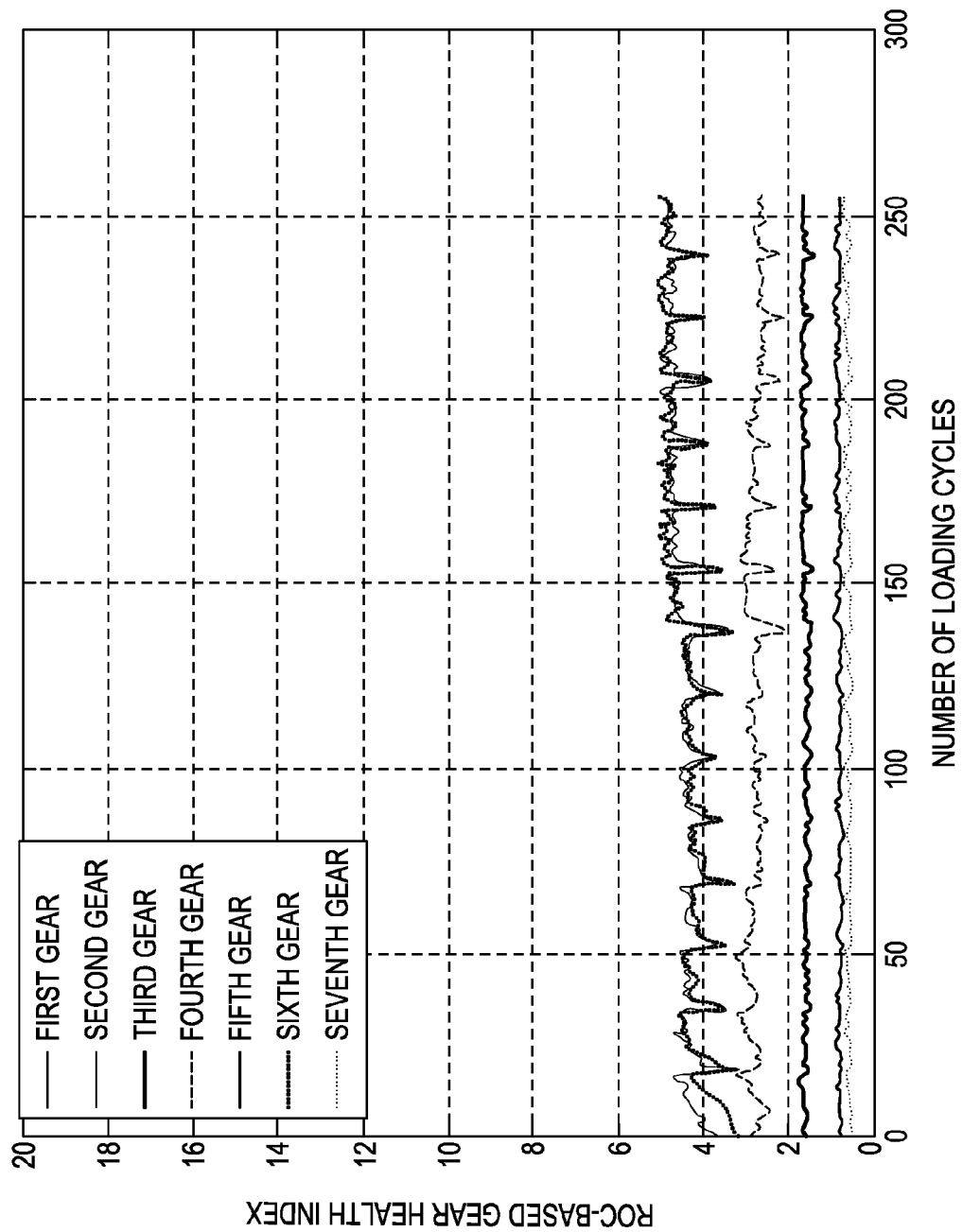
FIG. 18(a) is a plot of ROC-based indices or signatures indicative of the state of health of individual gears in an automotive gearbox versus the number of loading cycles applied to said gears, in a data set wherein all gears were judged to be healthy.
Figure 18B:
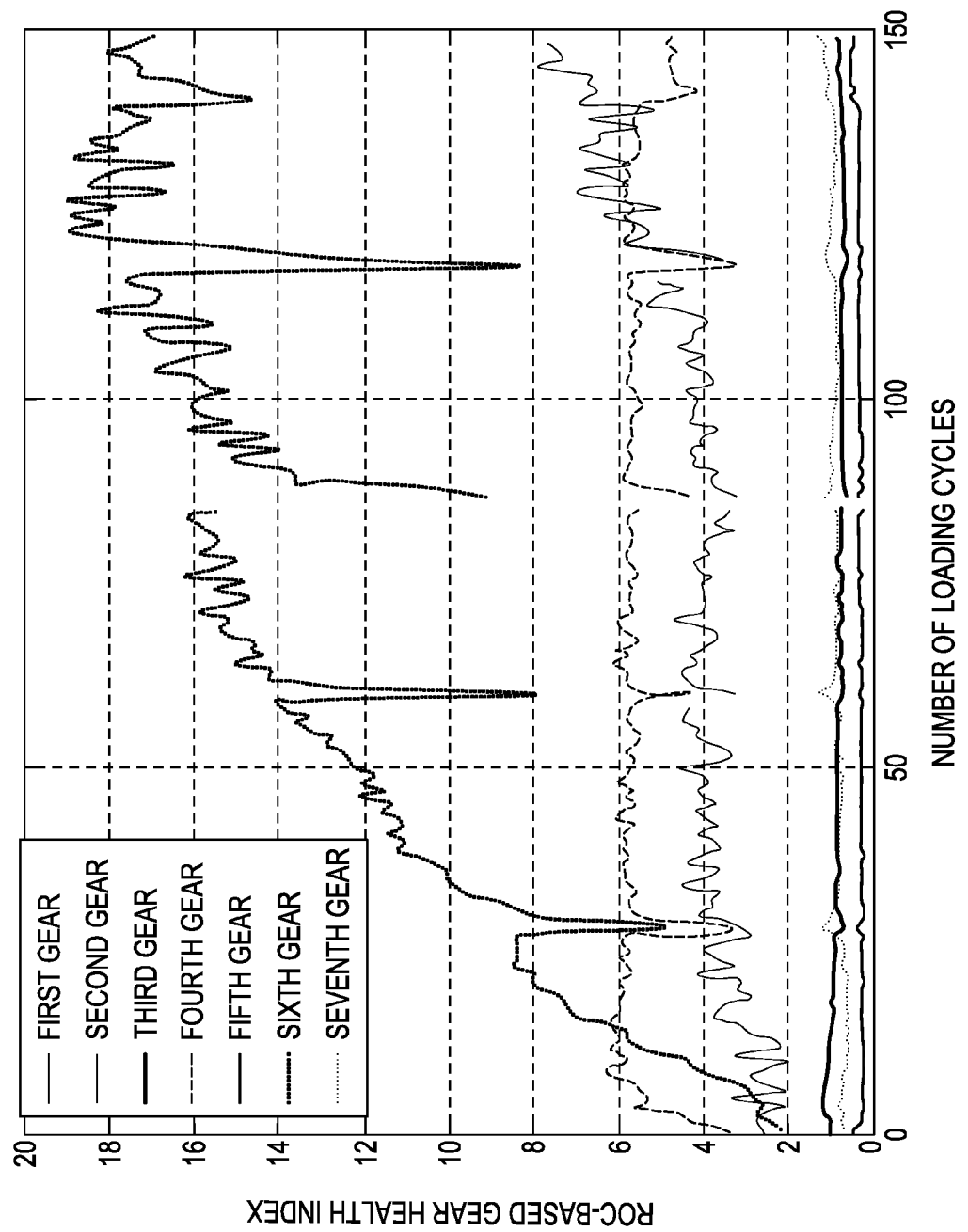
FIG. 18(b) is a plot of ROC-based indices indicative of the state of health of individual gears in an automotive gearbox versus the number of loading cycles applied to said gears, in a data set wherein fourth and sixth gear sustained measurable physical damage that would have required failure or subsequent physical inspection to detect.
Figure 19:
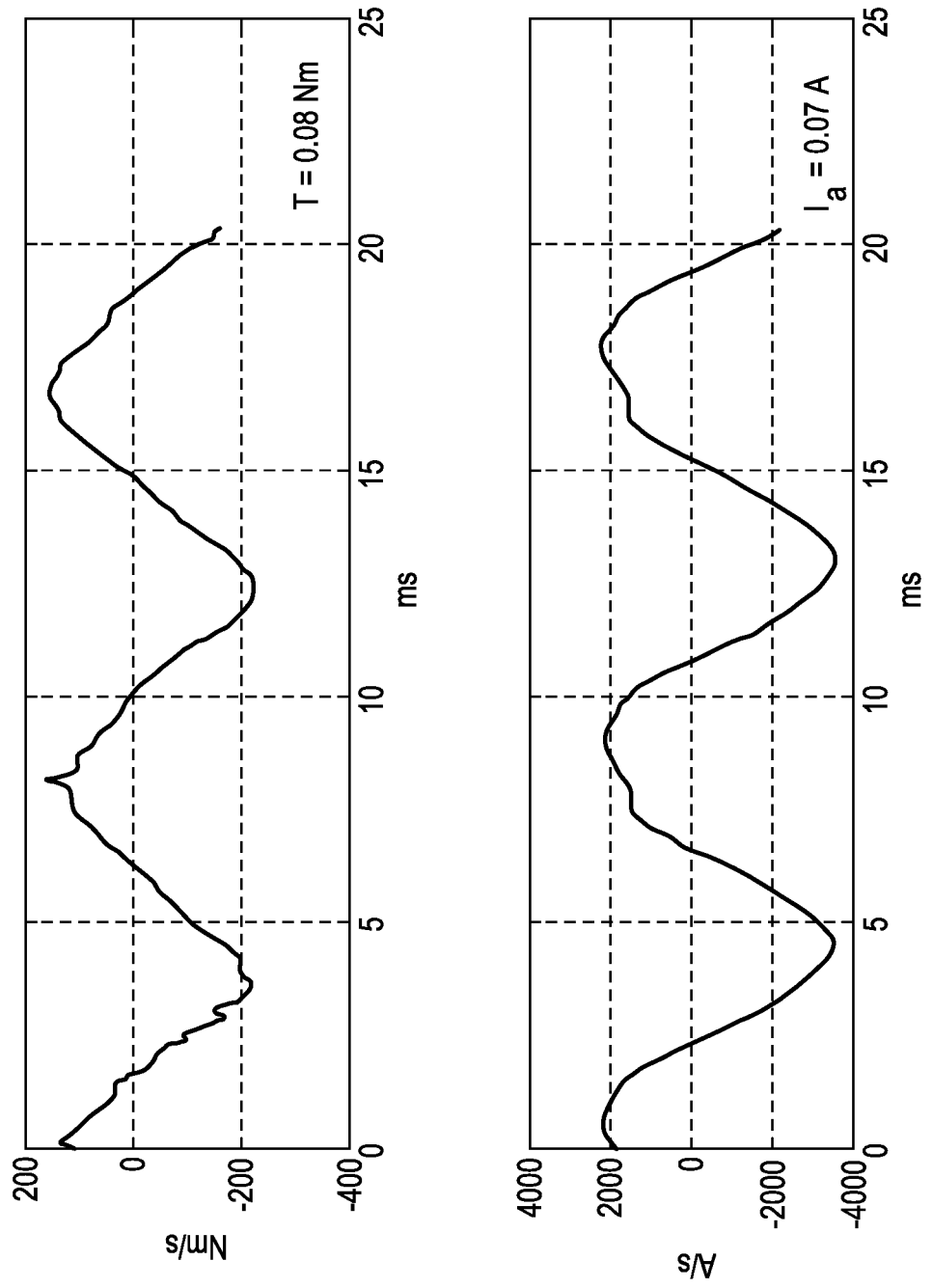
FIG. 19 is a plot of rate of change of torque (ROC) signals (upper trace) and rate of change of current (ROCC) signals (lower trace) obtained on an electric motor with the motor operating unloaded at 2000 rpm.
Figure 20:
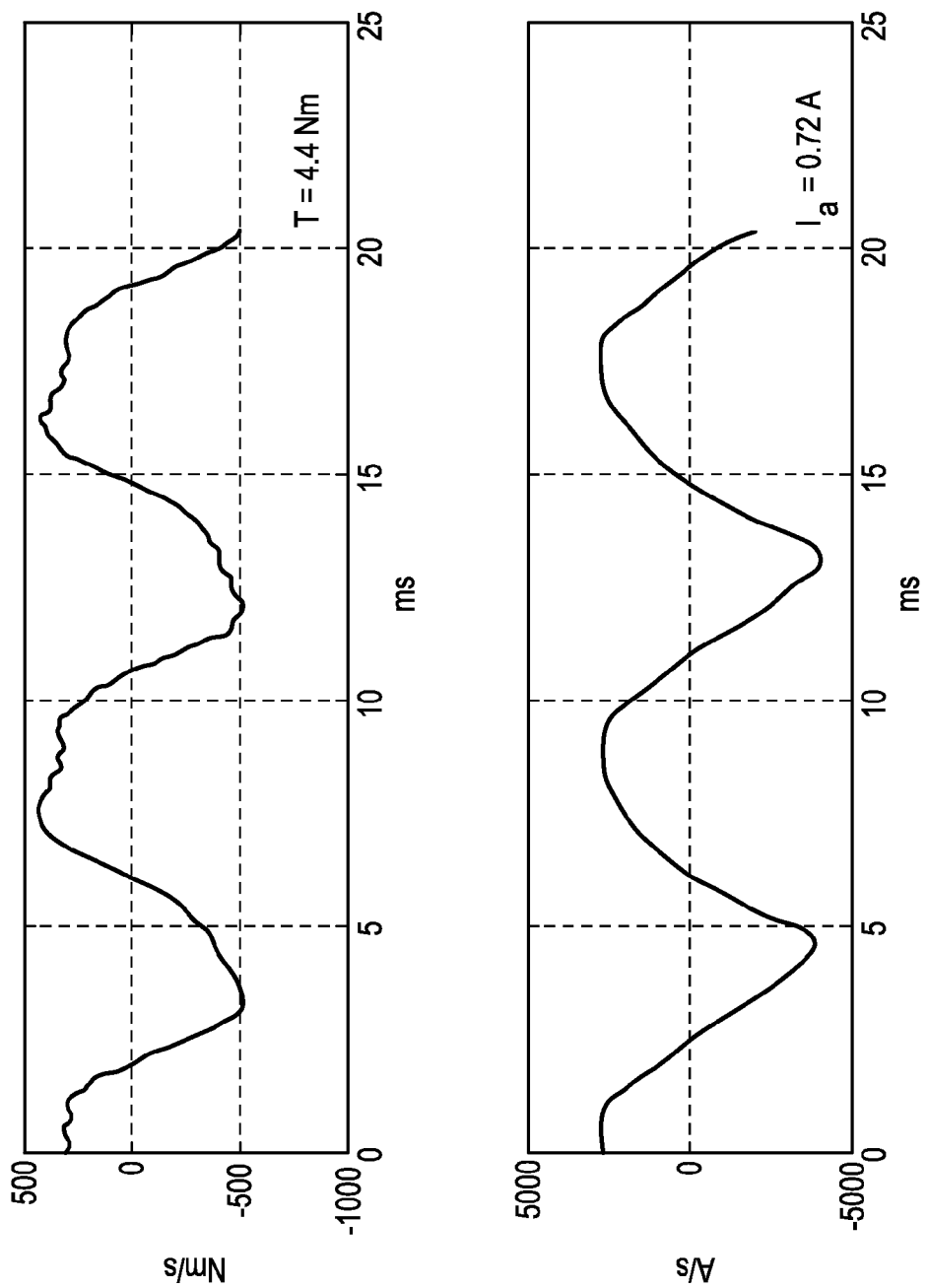
FIG. 20 is a plot of rate of change of torque (ROC) signals (upper trace) and rate of change of current (ROCC) signals (lower trace) obtained on an electric motor rotating at 2,000 rpm with the motor loaded as indicated.
Figure 21:
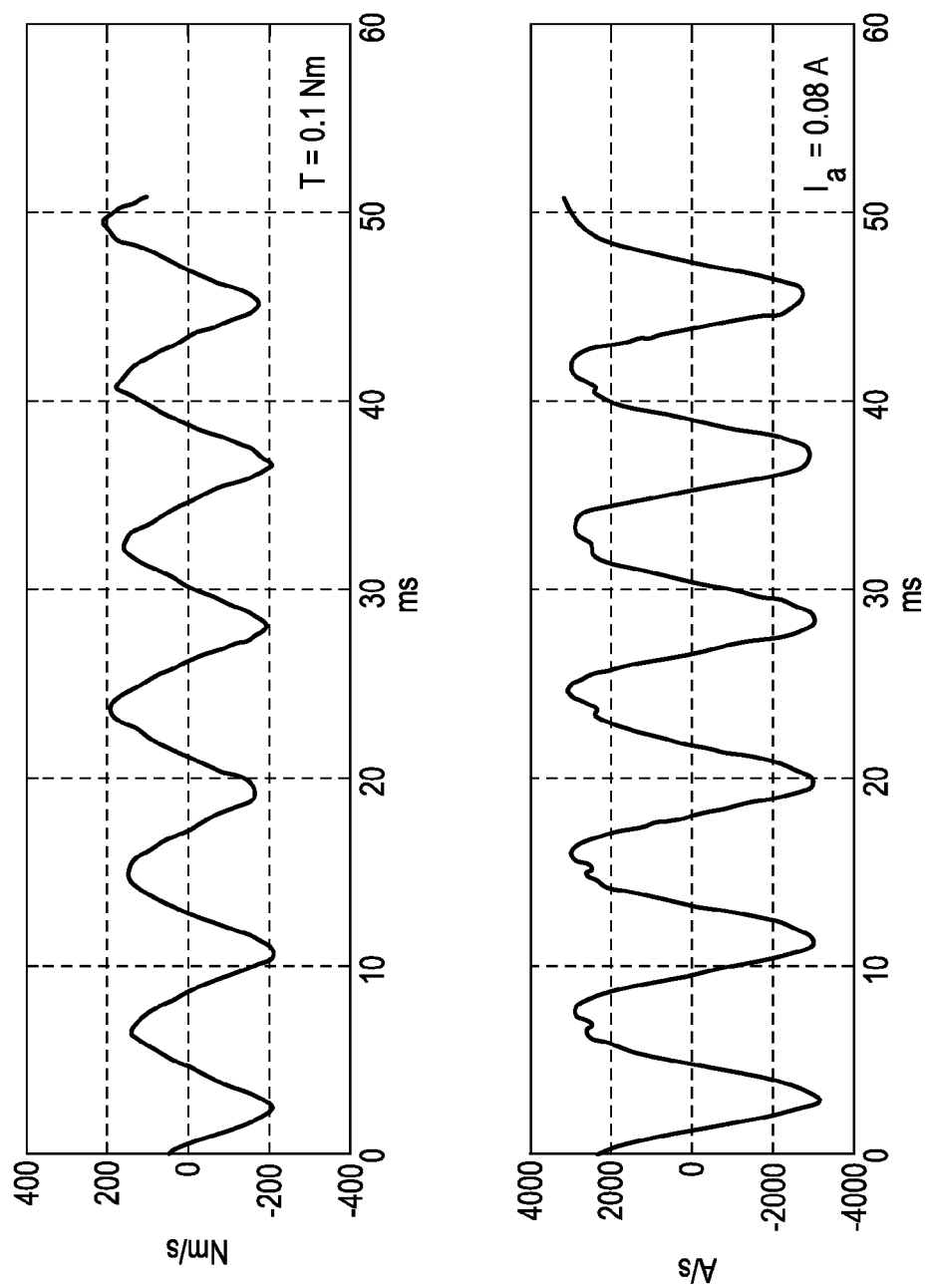
FIG. 21 is a plot of rate of change of torque (ROC) signals (upper trace) and rate of change of current (ROCC) signals (lower trace) obtained on an electric motor rotating at 2,400 rpm with the motor loaded as indicated.

With respect to the last application listed above, refer to FIG. 18, which displays plots of gear health condition indices that were derived from ROC measurements made by an ROC sensor constructed according to the present invention and installed on an automotive transmission during a transmission dynamometer test. In FIG. 18(*a*) the indices for the individual gears display a consistent signature characterized by a low index amplitude. Subsequent inspection of the physical gears following the test confirmed the good health of the components. Conversely, in FIG. 18(*b*) the indices for two of the individual gears (fourth gear and sixth gear) display an inconsistent signature characterized by a gradually increasing index amplitude. Subsequent inspection of the physical gears following the test confirmed mechanical damage to these specific individual gears. These results validate the usefulness of the ROC signal for transmission health and usage monitoring applications.

G. Applications: Electric Motors

ROC sensors of the invention have been successfully tested on electric motors. To both examine quantitative predictions and observe the size and informational content of signals from an embodiment of an ROC sensor system as illustrated in FIG. 3, a ring, shaft, and coil combination was constructed. The stainless steel shaft was installed between a 1.5 horsepower, 2 pole compound motor and an eddy current dynamometer. The ring was constructed out of T-250 18% Ni maraging steel. Ring inner diameter and shaft outer diameter had matching 1:48 tapers to ease press-fit assembly to attain mechanical unity and create a circumferential magnetic easy axis in the ring. A 1000 turn solenoidal coil was mounted about and coaxially with the ring/shaft and axially centered over the ring. Although the nameplate rated speed of the motor was 2300 rpm, actual speed was controlled over the range of 0-4000 rpm by varying the motor armature voltage. Armature power came from a bridge rectifier through a variable autotransformer on a 208V 60 Hz line. Armature current therefore contained both steady state and unipolar 120 Hz components. Speed in rpm was determined as the frequency of the pulse train generated in an inductive pickup mounted close to a 60 tooth gear on the extended dynamometer shaft. Torque was controlled by adjustment of the current supplied to the eddy current brake and measured (as the reaction torque on the dynamometer casing) by a strain gauge load cell.

Other instrumentation included meters for both shunt field and armature DC current and voltage. The emf (electromotive force) induced in the ROC coil (acting as the sense element of the present invention) was displayed on one channel of a recording oscilloscope and a signal proportional to the rate of change of armature current (ROCC) was displayed on a second channel.

FIGS. 19-23 show the oscillographs taken under the conditions indicated. The vertical scales are altered from mV/division to reflect the independent calibrations of the two channels. The DC armature current is indicated in each ROCC plot, whereas the steady state torque reading from the dynamometer load cell is indicated in each ROC plot. It is immediately apparent that the amplitudes of the ROC signals increase with increasing amplitudes of the corresponding ROCC signals.

Figure 22:
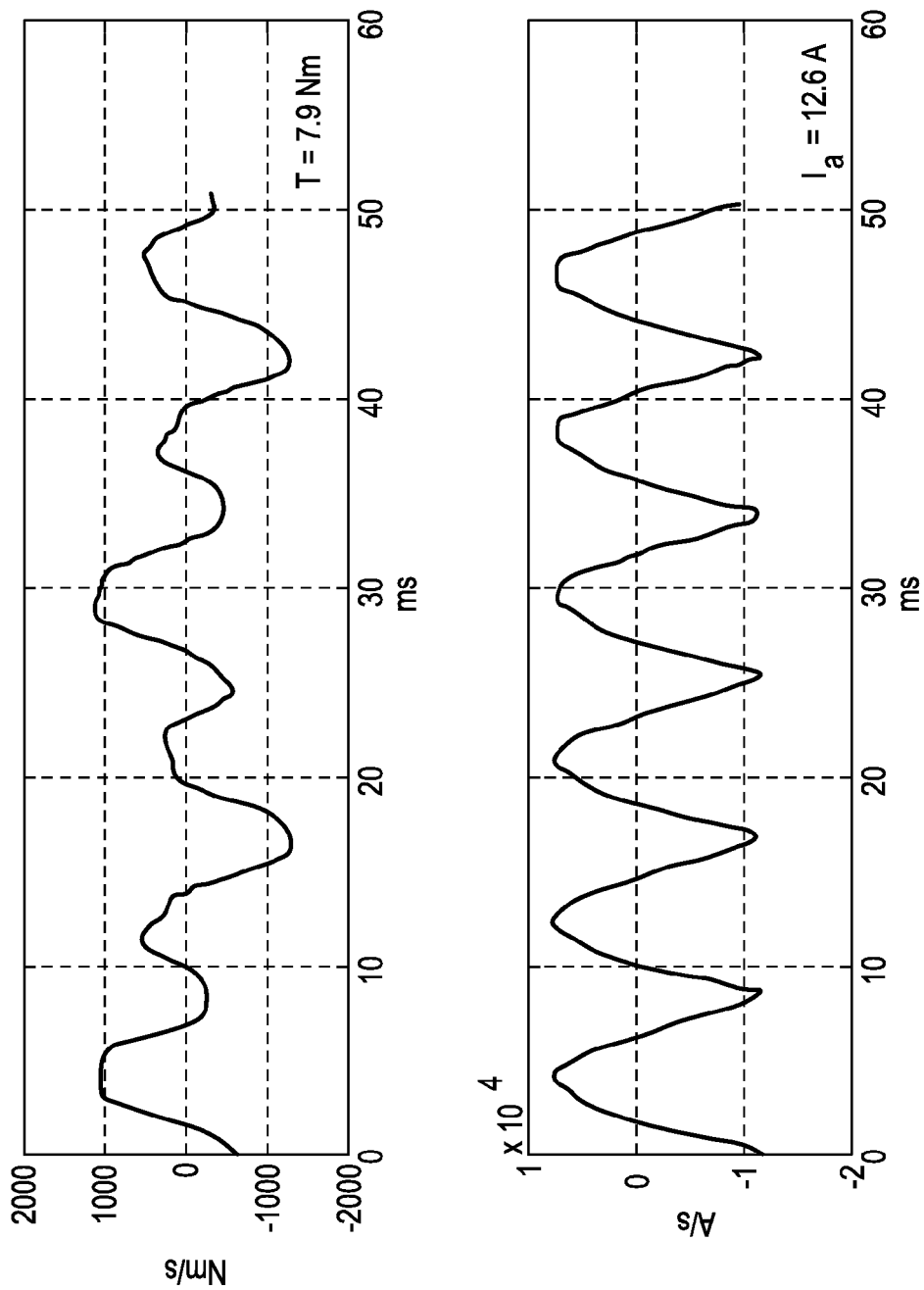
FIG. 22 is a plot of rate of change of torque (ROC) signals (upper trace) and rate of change of current (ROCC) signals (lower trace) obtained on an electric motor rotating at 2,442 rpm with the motor loaded as indicated, showing a torsional oscillation in the ROC signal at a frequency of approximately 40 Hz.
Figure 23:
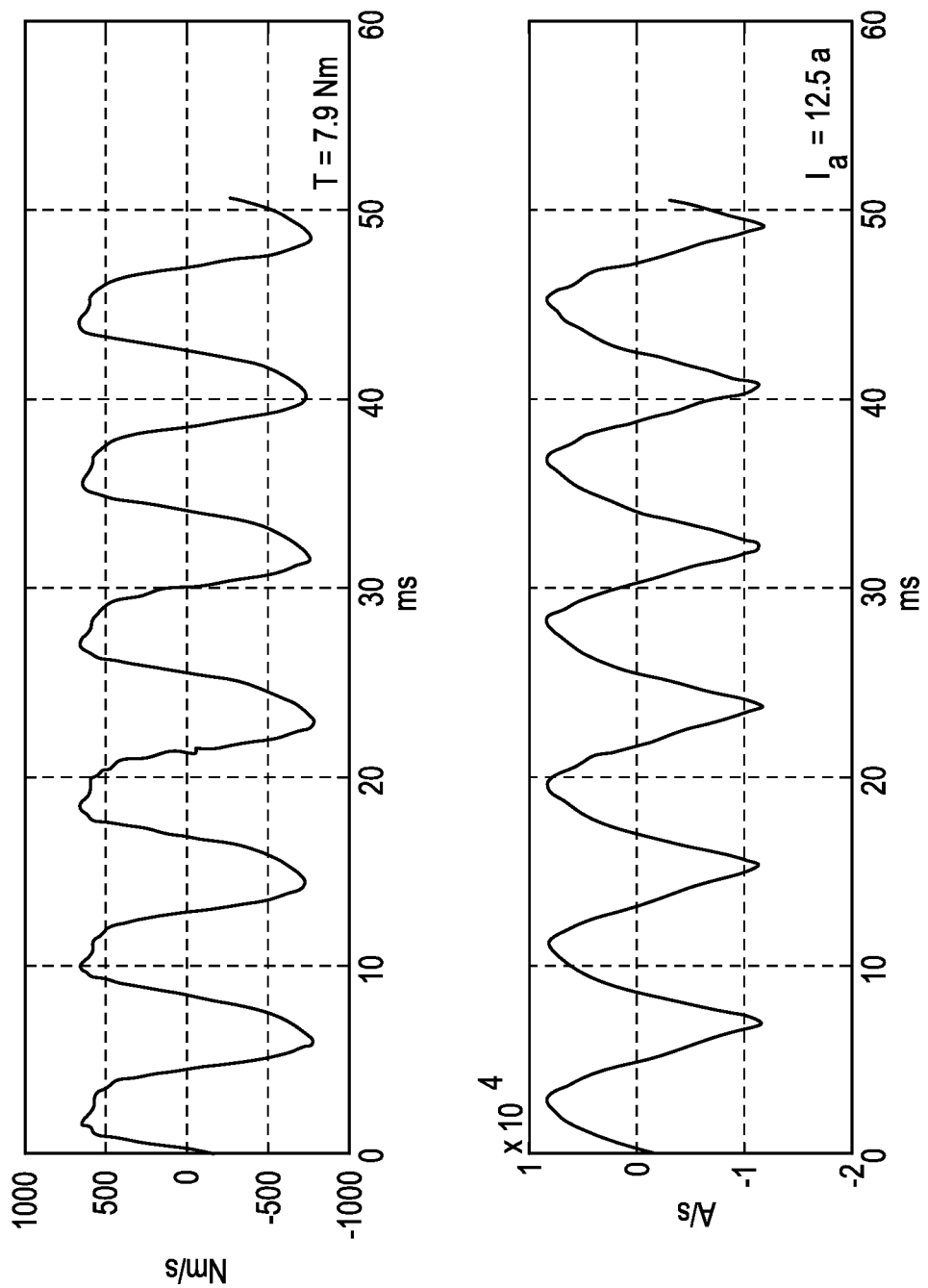
FIG. 23 is a plot of rate of change of torque (ROC) signals (upper trace) and rate of change of current (ROCC) signals (lower trace) obtained on an electric motor rotating at 2,400 rpm with the motor loaded as indicated.
Figure 24A:
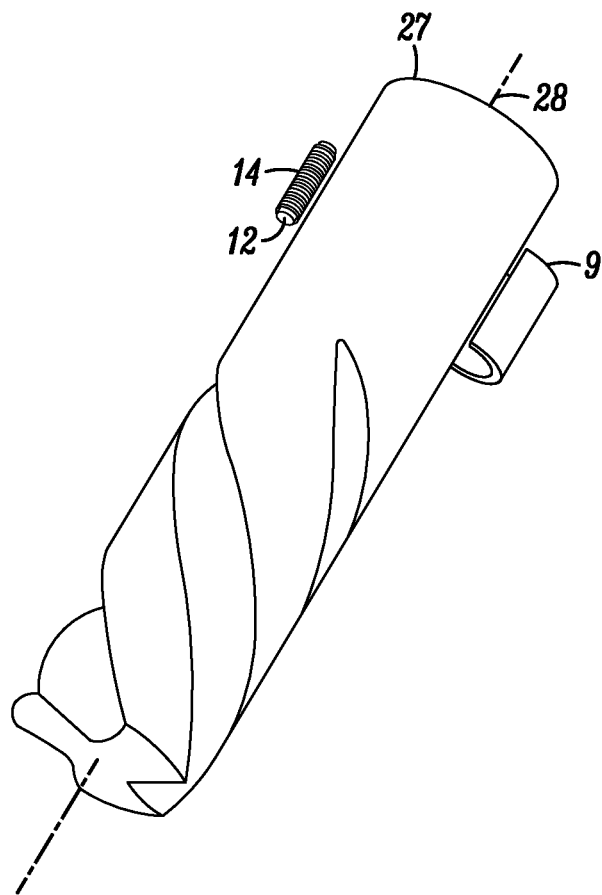
FIGS. 24(a) and (b) are drawings showing an ROC sensor comprised of a permeable member having a coil acting as the sense element located proximate to a milling machine cutter exposed to the continuous circumferential magnetization from a straddling magnet acting as the member carrying or subjected to a time-varying torque of the present invention.
Figure 24B:
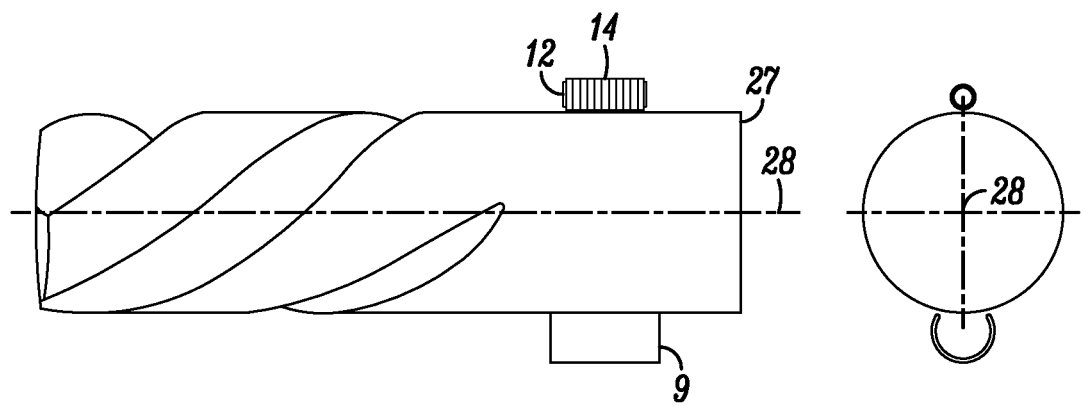

Also, except for the ROC plot of FIG. 22, the zero crossings of the two signals are well synchronized. This is as expected since the direct source of the motor torque is the armature current. When this current changes, the torque changes. A zero ROCC indicates that the motor torque is constant, with the expected result that, in the absence of other disturbing influences, the torque being transmitted to the dynamometer is also constant, hence the ROC signal is zero. The shape differences between the ROC signals in FIG. 19 and FIG. 20 clearly reflect the differences in the shapes of their respective ROCC signals. Far more significant, however, are the differences seen in the ROC signals in FIG. 22 and FIG. 23. While the ROC signals in these two figures differ primarily in amplitude, the ROC signal of FIG. 22 shows large amplitude swings. These are stimulated by the resonance between the operating speed and 120 Hz component of current. These oscillations have almost totally subsided at the only slightly lower speed of 2400 rpm (FIG. 23). The usefulness of the ROC signal in diagnosing such an oscillation is illustrated by this experiment. Such information can be used in closed-loop control for a variety of applications including, without limitation, minimizing torque ripple in brushless motors, attenuating cogging torque in stepper motors, or easing commutation in other types of electric motors.

H. Applications: Tool (Condition) Monitoring

ROC sensors according to the invention have been successfully tested on milling machine cutters where their signals have clearly indicated a wealth of information with respect to the condition of milling cutters and operating parameters associated with milling operations. Cutting tools naturally degrade with use by wear, chipping or fracture, and the efficiency and quality of the product being machined is highly dependent on the tool condition. Theoretical analysis was compared with experimental data in detecting changes in torque during each cutting event, and the ROC signal was investigated for a variety of cutting tool conditions.

H1. Introduction

Consistency in the quality of manufactured products, as well as the efficiency of their production, are strongly dependent on both the operating parameters (e.g., speed, feed rate, depth of cut, coolant, etc.) and the condition of the cutting tool. All cutting tools degrade with use, both continuously by loss of sharpness and dimensional change through wear, and/or precipitously by chipping or fracture. Sub-optimum performance of dull or broken tools negatively impacts both the dimensional integrity and texture of the machined surfaces. The strong need for means other than a machine operator to monitor tool condition and to ensure that there are appropriate operating parameters is well recognized.

Many types of cutting operations are performed with continuously rotating tools having one or more (n) cutting edges ("flutes" or "teeth"). Although in some types of cutting operations each such edge is in continuous contact with the workpiece (e.g., drilling, reaming, tapping), oftentimes, as in milling, each edge cuts intermittently. Even in continuous-contact types of operations, the interplay of spindle inertia, elasticity of the cutting tool, and the vicissitudes of chip formation, introduce variational components into the forces acting on the tool edges. Thus, a natural condition in machining operations using rotating tools is a time-varying torque driving the tool. As will become apparent in what follows, signals generated by the ROC sensor display features more clearly and sensitively indicative of the condition of the tool and of the operation than signals responsive to the torque itself.

Rotating tools are typically comprised of two axially distinct regions: a working (cutting) region and a concentric "shank" region by which the tool is held and driven. Shank-driven tools for performing milling operations are known as "end mills". Being both cylindrical and furthest from the working end of the tool where flying chips (often sharp and hot) and splashing coolant, present a rugged environment, this shank region is a naturally preferred sensor location.

As previously described, ROC is readily sensed as a proportional emf induced in a coil encircling a circumferentially magnetized region of a magnetoelastically active member subjected to or carrying a time-varying torque. Analytical and experimental results relating to a sensor having this basic construction, installed over a small axial portion of the end mill shank between the machine spindle and the cutting region of the tool is described in what follows.

H2. Theory

A. Forces on a Milling Cutter

Figure 25C:
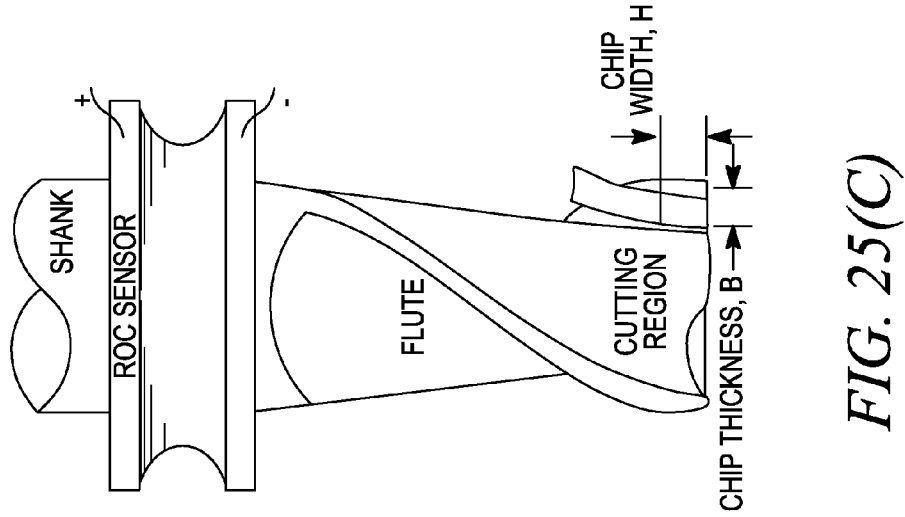
FIG. 25(c) indicates chip geometry and an ROC sensor comprised of a coil acting as a sense element of the present invention located proximate to the shank of the cutting tool acting as the member carrying or subjected to a time-varying torque of the present invention.
Figure 25A:
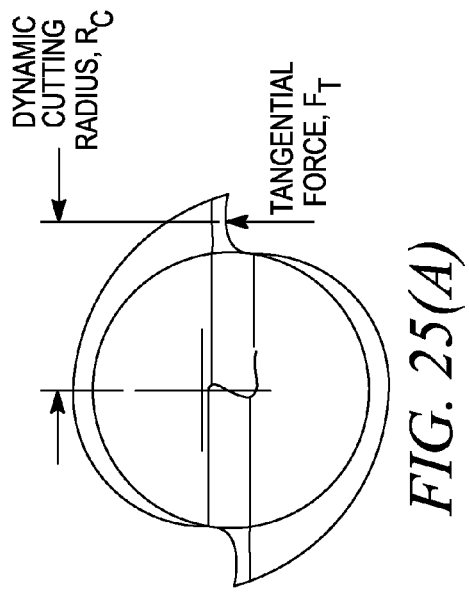
FIGS. 25(a) and (b) indicate cut geometry and the fact that chip load is a function of chip area, b·h, when considering an analytical model that simulates a 2 flute cutter centered over the workpiece, wherein θ is the cutter angle.
Figure 25B:
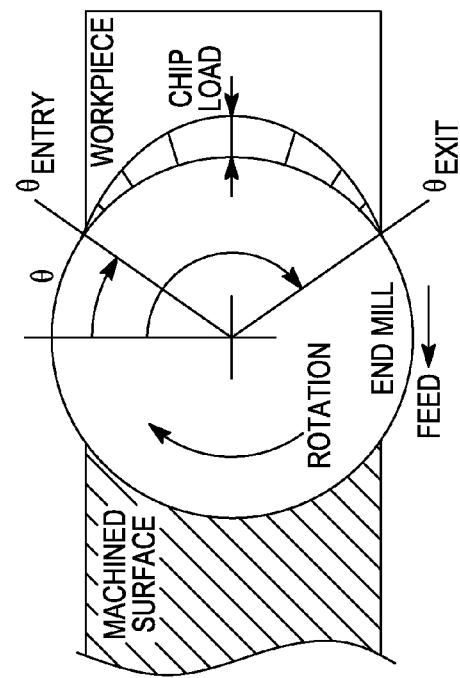
Figure 26:
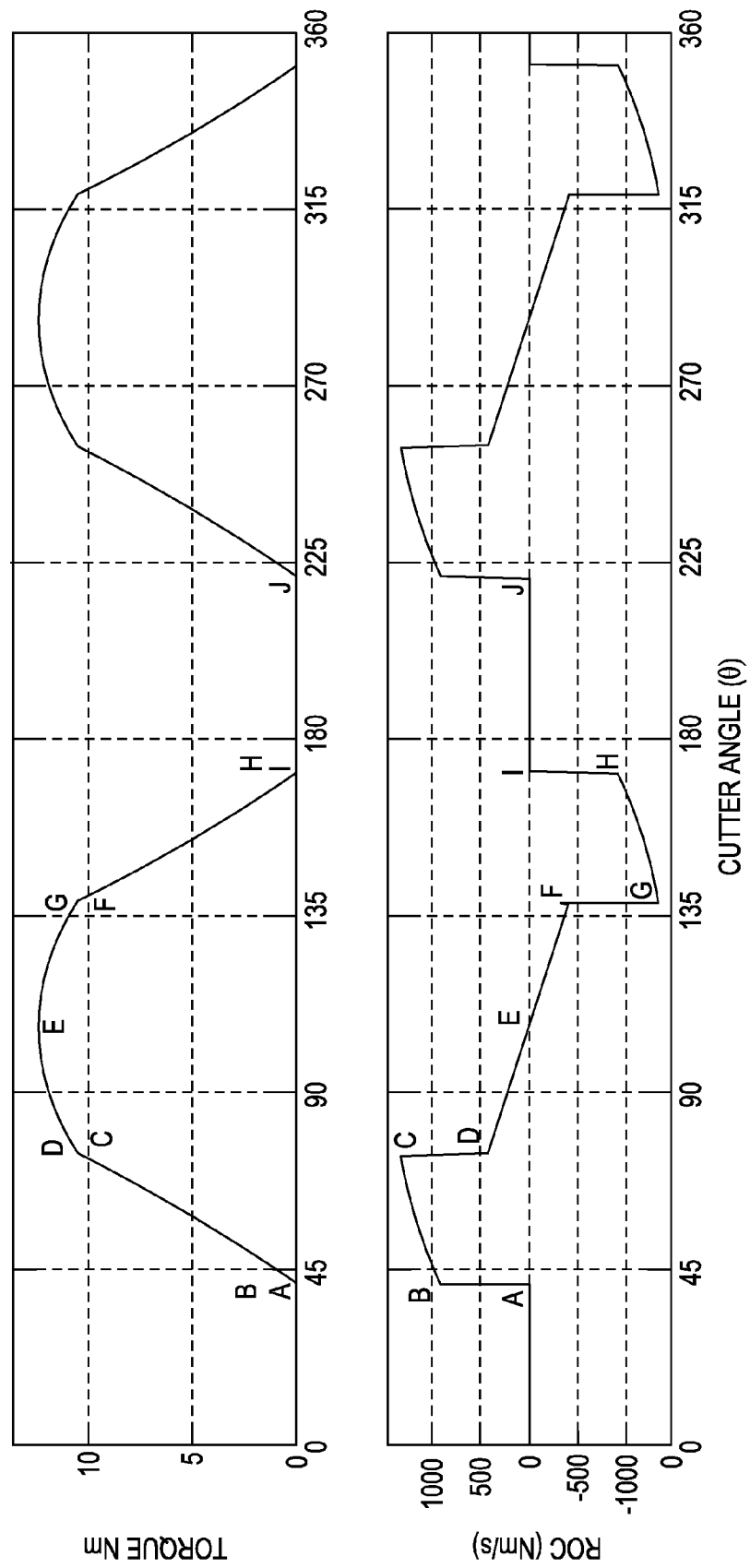
FIG. 26 shows the output of an analytical model for torque and ROC on a 25.4 mm diameter, 2 flute cutter executing a simulated 6.35 mm cut depth on a 19 mm wide aluminum workpiece, with a cutter rotational speed of S=10 rps and a feed rate f=2.54 mm/sec.

As shown in FIG. 25(a), a tangential force, $F_t$, associated with the cutting action arises on the cutting edge of an end mill, here shown with two flutes (n=2). (Axial and radial forces are not considered here, since the present focus is on the torsional moment associated with the cutting action.) $F_t$ has three basic sources: the force needed to shear the material from the workpiece, thereby forming a "chip", the force needed to deform (curl) the chip, and the force of friction between the chip and the surface of the cutter. In the simplest model, used here, the cutter, workpiece, and machine, are all considered to be rigid bodies, i.e., undeformed by the cutting forces. In this model, $F_t$, acting on each active cutting edge is found from the very simple equation $$F_t = Kb \quad (11)$$

where, as indicated in FIG. 25(c), h is the chip width and b is the chip thickness. K is a "constant", having units of stress, increasing with workpiece material shear strength, and varying with tool geometry, and with average h. The workpiece moves at a continuous "feedrate", f, towards a rotating cutter (speed S). As a result of these combined motions, together with the helicity of the flute, both b and h vary with the cutting angle, θ. $F_t$ and torque, $T = F_t r_c$, thus vary continuously with time, t. Moreover, for n>2, and depending on the width of the workpiece relative to the cutter diameter, more than one tooth may be cutting at the same time. Following the very detailed analysis presented by Tlusty, et al. (Annals of the CIRP, volume 24, no. 21 (1975)), the numerical values for T as a function of θ can be derived. This is plotted in the upper portion of FIG. 26 for the conditions indicated. The rate of change of T, (ROC=dT/dt), is plotted in the lower portion of FIG. 26.

Events occurring at salient values of θ are noted as A-J in the plots. By following the sequence of these events, it will become evident why their effects are more pronounced in the ROC plot than in the T plot. Since, for the example analyzed, the workpiece is thinner (19 mm) than the cutter diameter (25.4 mm), the leading point of the cutter first contacts the workpiece at A ($\theta_{entry}=\cos^{-1}(19/25.4)=42°$). b grows rapidly from zero during the few degrees (at most) of rotation required for the point to fully penetrate the workpiece (A-B). (As those in the art will appreciate, this depends on a cutting edge geometry feature known as "rake" angle.) Due to flute helicity, h also grows slightly from zero during this small rotation. Although T grows from zero to only an imperceptible value as the chip formation starts, the ROC, reflecting db/dt, jumps precipitously. While h grows (somewhat faster than linearly) with increasing θ, since b≈f sin θ/Sn, b grows ever more slowly. Nevertheless the growth rate of b·h (i.e., the "chip load") continues to grow from B-C. At C, h reaches the full depth of cut (at which it remains until G); the ROC drops precipitously (C-D) as dh/dt→0. The ROC continues to fall with the slowing growth in b until E, where b reaches its maximum, as does T. The ROC is now zero. As b diminishes (db/dt<0), (E-F), the ROC becomes negative. At F (θ=180°−42°=138°), the leading point of the cutter passes the workpiece edge. Again in just a very small additional rotation, the bottom edge of the chip is sheared through, causing a sudden drop in the ROC (F-G). With further rotation, h diminishes (dh/dt<0) at a somewhat less than linear rate, until reaching zero at H, where the chip is cut loose from the workpiece. The sudden drop (H-I) of the ROC to zero reflects the disappearance of dh/dt. When θ=222° (J), the point of the second tooth contacts the workpiece, and the same series of events is repeated.

B. Sensor Operation

The magnetoelastically active, circumferentially polarized portion of the member carrying or subjected to a time-varying torque here is the solid shank of an end mill made of a high speed steel (HSS). One popular High Speed Steel is M42: 9.5 Wt. Pct. Mo, 8.0 Co, 3.75 Cr, 1.6 W, 1.15 V, 1.08 C, Balance Fe has high enough alloy content and hardness following heat treatment to obtain a coercivity high enough (40-60 Oe), to ensure long term stability of a purposefully instilled remanent circumferential magnetization, M. The Cr and Co content justify expectations for a magnetostriction, λ≈15 ppm, a value which will be seen to be suitable for this application. Using the model for magnetization tilt developed by Herbst and Pinkerton, supra, and assuming the alloy has a random distribution of cubic crystallites with <100> easy axes, crystal anisotropy K of 400,000 ergs/cm³, a remanent induction 4πM=10 kG, and a demagnetizing factor $N_D$=0.03, the axial component of magnetization at the shank surface, due to the stress $\sigma_R$ at this radius (R), caused by T, is found from $$M_{aR} = M\left(\frac{0.8986\lambda\sigma_R}{K + 0.2126 N_D M^2}\right) \quad (12)$$

Since σ varies inversely with radius r, $M_{ar}$ at r is found from $$M_{ar} = \frac{r}{R} M_{aR}. \quad (13)$$

The total axial flux, $\phi_A$, within the cutter shank is found as the integral of the flux contributed at each radius:

$$\phi_A = \int_0^R \frac{4\partial M_{ar} r 2\partial r dr}{R} = \frac{8\partial^2 M_{ar} R^2}{3} = 6.988 \cdot 10^{-7} \sigma_R R^2 \quad (14)$$

which in terms of T, since $\sigma_R = 2T/\pi R^3$, is found as $$\phi_A = 0.4448 \times 10^{-6} \frac{T}{R}. \quad (15)$$

Differentiating (15) with respect to t gives $$\frac{d\phi_A}{dt} = \frac{0.4448 \times 10^{-6}}{R} \frac{dT}{dt} \quad (16)$$

where dT/dt is recognized as the ROC. With ROC and R in cgs units, a coil of N turns encircling the shank will thus have an emf $$e = N \frac{d\phi_A}{dt} \times 10^{-8} = 0.4448 \times 10^{-14} \frac{N \times ROC}{R} V \quad (17)$$

induced therein. Inserting the equal plus and minus peak ROC values of 1350 Nm/s (=1.350×10$^{10}$ dyne cm/s) seen in FIG. 26(b), R=0.635 cm, and N=1000 turns, into (17), the predicted peak±voltages are each found as 0.0946 volts.

H3. Experiments

Experiments were conducted using 2, 4, and 6 flute, 25.4 mm diameter end mills, with 12.7 mm diameter shanks Each was circumferentially magnetized with a 550 A, 2 ms duration, axially conducted current pulse. The emf induced in a 1000 turn coil on a 9.5 mm long nylon bobbin was amplified by 3, and low pass filtered with a 500 Hz cutoff frequency. A 19 mm wide piece of 2024-T4 aluminum was milled at a rotational speed of 600 rpm, 6.35 mm depth of cut, with a feed rate of 2.54 mm/s using mist coolant.

Figure 27:
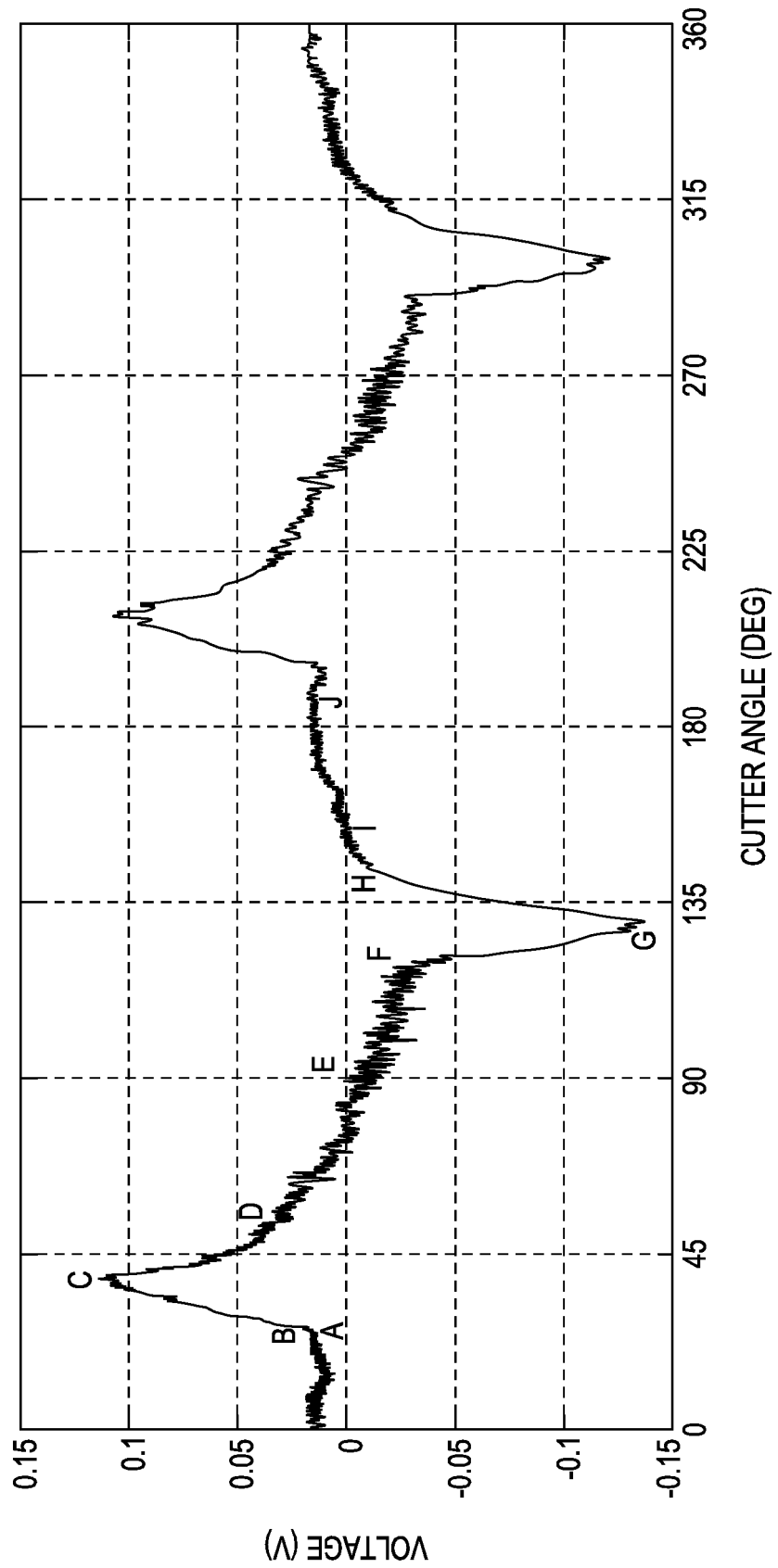
FIG. 27 shows ROC signals recorded on a sharp 2-flute cutter.

As seen in FIG. 27, the ROC signal from a newly sharpened 2 flute cutter, exhibits "signature" features analogous to those predicted in the numerical model. The sharp rise at point A signals contact of the point of the first tooth. As predicted, the ROC signal rises rapidly to B, then with decreasing slope to C. Not surprisingly, the elastic and plastic strains of a real material and real cutter, reduce the suddenness of the initial rise and blend the slope changes. The same is true of the fall of the positive ROC, C-D-E, to zero at maximum chip load, the subsequent decrease (ROC<0) E-F-G, where the cutter point breaks through the workpiece edge, and the peeling of the chip G-H and final severance, H-I. I-J is not quite zero after the cut finishes since the edge "scrapes" the already cut surface of the workpiece. The same ROC signature features are seen to be repeated for the second tooth. Peak±signals with this sharp cutter averaged 0.117 V, or 0.0399 V induced in the coil.

Figure 28:
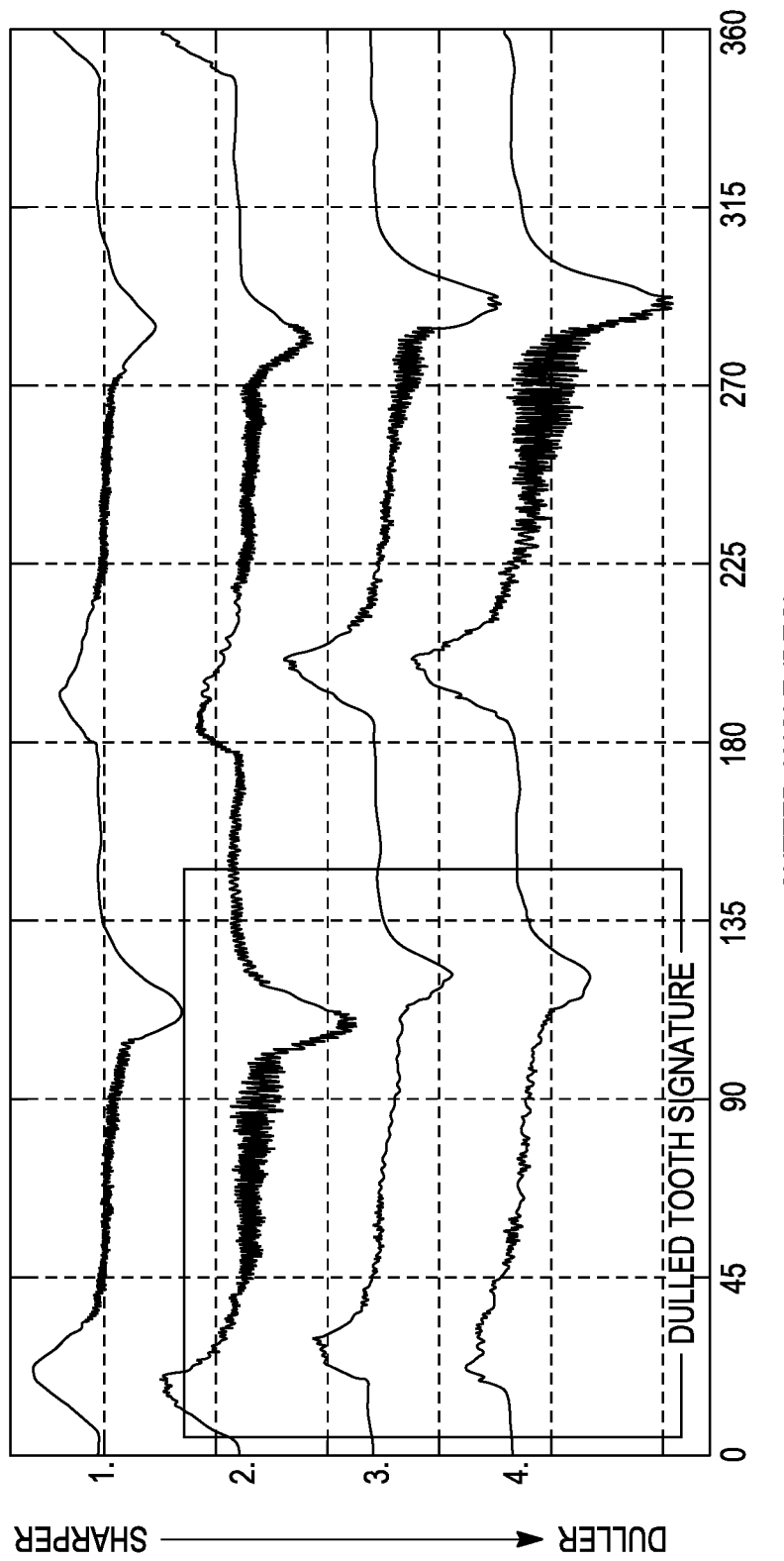
FIG. 28 shows changing ROC signals generated using progressively greater intentional dulling of one tooth of a 2-flute cutter.
Figure 29:
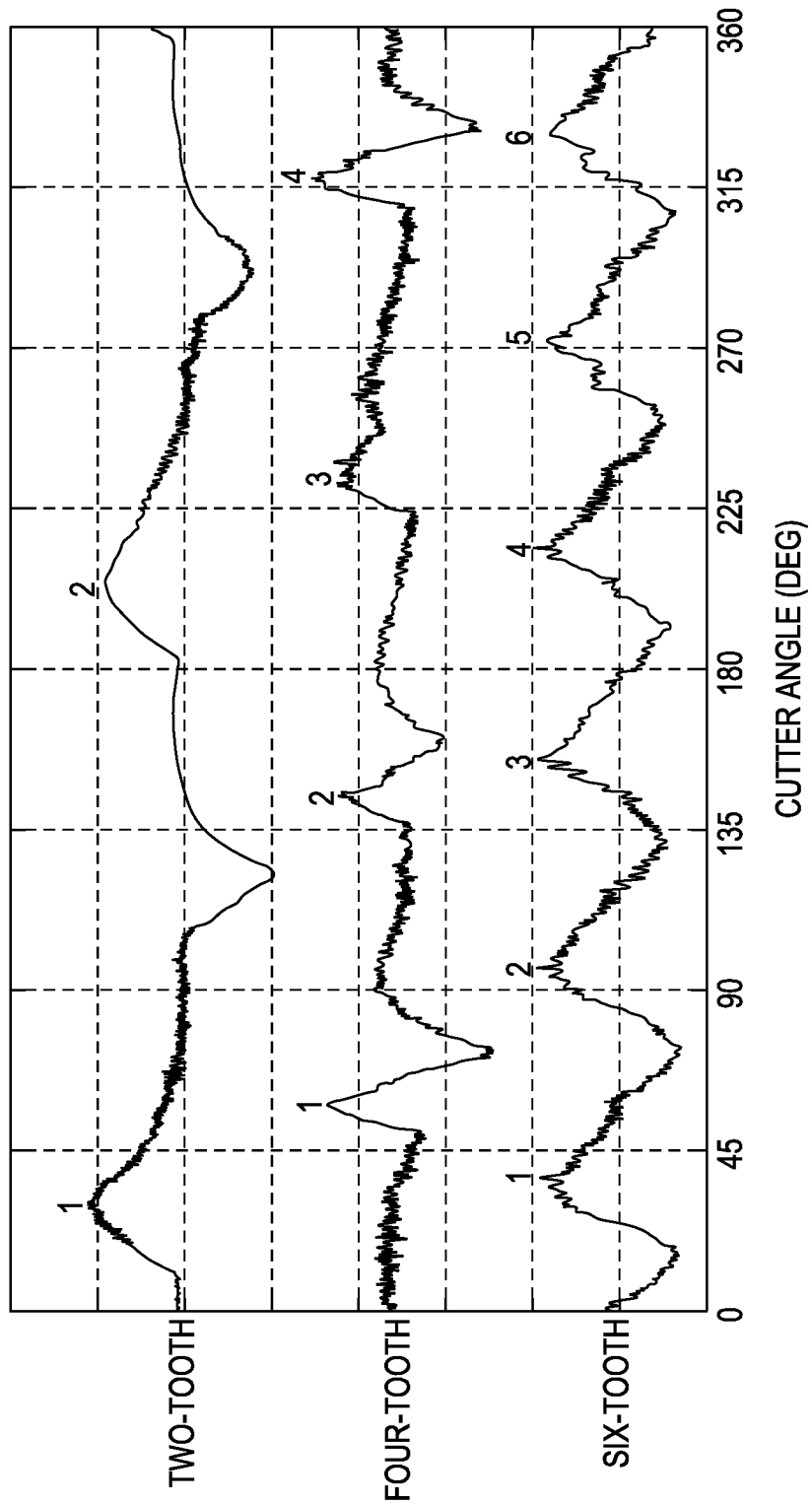
FIG. 29 shows ROC signals for cutters having 2, 4, and 6 flutes.

As seen in FIG. 28, dulling the cutting edge on one flute of a two flute cutter upset the near equality of the ROC signals. With slight dulling (Plot 2), the associated ROC signal increased in peak value. With further dulling (Plots 3 and 4) these signal portions decreased while the peak amplitudes of the signal associated with the following tooth were magnified. Slight dulling seems only to decrease cutting efficiency, whereas more severe dulling, by reducing the effective tool radius, reduces the chip thickness. As a result, the peak chip load of the second (sharp) tooth is increased, evidenced in the larger peak amplitudes of those portions of the ROC signals. Audible chatter also arose with dulling. This is clearly indicated by the high frequency content of the high chip load portions of Plots 2-4. The plots in FIG. 29 show feature repetitions mirroring n. Noticeably different signature features for n=4, 6 reflect the start of a second tooth cut before the first tooth has finished. The sensitivity of ROC signals to small changes in tool condition is illustrated by flute to flute signal variations, especially noticable in the n=4 plot. These were found to vary even with small (<0.025 mm) variations in tool eccentricity.

H4. Discussion

The ROC of torque has been modeled through a simple but rigorous analysis, and experimentally measured for various tools under different operating conditions. In each case, signature features observed in the ROC signals mirrored like features predicted by the model. Additionally, it was observed that as tool conditions changed, the ROC signal changed correspondingly, displaying features indicative of the work done by individual teeth, and of the presence of non-ideal cutting conditions such as chatter. Overall, it was observed that the ROC signal can provide clear indications as to the condition of the tool and of the cutting operation.

All of the articles and methods disclosed and claimed herein can be made and executed without undue experimentation in light of the present disclosure. While the articles and methods of this invention have been described in terms of preferred embodiments, it will be apparent to those of skill in the art that variations may be applied to the articles and methods without departing from the spirit and scope of the invention. All such variations and equivalents apparent to those skilled in the art, whether now existing or later developed, are deemed to be within the spirit and scope of the invention as defined by the appended claims. It will also be appreciated that computer-based embodiments the instant invention can be implemented using any suitable hardware and software.

All patents, patent applications, and publications mentioned in the specification are indicative of the levels of those of ordinary skill in the art to which the invention pertains. All patents, patent applications, and publications are herein incorporated by reference in their entirety for all purposes and to the same extent as if each individual publication was specifically and individually indicated to be incorporated by reference in its entirety for any and all purposes.

The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A sensor for detecting a rate of change of torque experienced by a member capable of transmitting torque, comprising:
   a. a sense element configured to output a signal indicative of a rate of change in torque experienced by a member carrying or subjected to a time-varying torque, wherein the sense element is capable of detecting a change in a magnetic parameter of a circumferentially magnetized region of the member positioned proximate to the sense element in response to a change in torque experienced by the member; and
   b. a processor operatively associated with the sense element and configured to process signals indicative of a rate of change in torque that are output from the sense element to determine a rate of change of torque experienced by the member; and
   c. a memory operatively associated with the processor.

2. A sensor according to claim 1, wherein the magnetic parameter is selected from the group consisting of magnetic flux and magnetization orientation.

3. A sensor according to claim 1, wherein the signal is a voltage.

4. A sensor according to claim 1, wherein the circumferentially magnetized region comprises a continuous circumferentially magnetized band.

5. A sensor according to claim 1, wherein the member comprises a plurality of circumferentially magnetized regions, at least two of which are optionally magnetized in opposite orientations.

6. A sensor according to claim 1, wherein the member comprises a plurality of spaced magnetized bands, wherein at least one of the plurality of spaced magnetized bands comprises continuous circumferential magnetization.

7. A sensor according to claim 1, wherein the sense element comprises a plurality of loops of an electrical conductor, optionally a solenoidal coil.

8. A sensor according to claim 1 further comprising a power supply operatively associated with the sensor, wherein the power supply optionally comprises a battery.

9. A sensor according to claim 1, wherein the sense element is disposed in a housing configured to position the sense element in spaced relation and proximate to the magnetized region of the member.

10. An assembly, comprising a sensor according to claim 1 positioned proximate to a member comprising at least one circumferentially magnetized region such that the sense element can sense a change in the magnetic parameter of the circumferentially magnetized region(s) of the member in response to a change in torque experienced by the member.

11. An assembly according to claim 10, wherein the member comprises a shaft including a plurality of spaced circumferentially magnetized regions, wherein each of the plurality of spaced circumferentially magnetized regions optionally is independently selected from the group consisting of a magnetized portion of the shaft and a magnetized ring fixed to the shaft.

12. An assembly according to claim 10, wherein the sense element is disposed in a housing configured to position the sense element in spaced relation and proximate to the circumferentially magnetized region(s) of the member.

13. An assembly according to claim 10 further comprising a power supply operatively associated with the sensor.

14. An assembly according to claim 10 further comprising a magnet spaced from a magnetized region of the member and positioned to maintain or enhance magnetization of the magnetized region of the member.

15. A method of detecting a rate of change of torque experienced by a member, comprising:
   a. subjecting a member having a circumferentially magnetized region to a time-varying torque; and
   b. using a sensor according to claim 1 that has been positioned proximate to the circumferentially magnetized region of the member to detect a rate of change in torque experienced by the member.

16. A method according to claim 15, wherein information relating to a rate of change in torque experienced by the member is used to control or monitor at least one of:
   a. absolute torque applied to or experienced by the member;
   b. a rate of change in torque experienced by the member;
   c. a parameter that results in a change in torque experienced by the member; and
   d. a parameter that functionally depends on a change in torque experienced by the member.

* * * * *